US012183319B2

(12) United States Patent
Danjyo et al.

(10) Patent No.: US 12,183,319 B2
(45) Date of Patent: Dec. 31, 2024

(54) ELECTRONIC MUSICAL INSTRUMENT, METHOD, AND STORAGE MEDIUM

(71) Applicant: CASIO COMPUTER CO., LTD., Tokyo (JP)

(72) Inventors: Makoto Danjyo, Saitama (JP); Fumiaki Ota, Tokyo (JP); Atsushi Nakamura, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 596 days.

(21) Appl. No.: 17/409,591

(22) Filed: Aug. 23, 2021

(65) Prior Publication Data

US 2022/0076658 A1 Mar. 10, 2022

(30) Foreign Application Priority Data

Sep. 8, 2020 (JP) ................................ 2020-150336

(51) Int. Cl.

*G10L 13/033* (2013.01)
*G10H 1/34* (2006.01)
*G10L 13/08* (2013.01)

(52) U.S. Cl.

CPC ........... *G10L 13/0335* (2013.01); *G10H 1/34* (2013.01); *G10L 13/086* (2013.01); *G10H 2220/221* (2013.01)

(58) Field of Classification Search

CPC ..... G10L 13/0335; G10L 13/086; G10H 1/34; G10H 2220/221

See application file for complete search history.

(56) References Cited

U.S. PATENT DOCUMENTS

| | | | |
|---|---|---|---|
| 2014/0006031 A1 | 1/2014 | Mizuguchi et al. | |
| 2017/0169806 A1 | 6/2017 | Hamano et al. | |
| 2019/0198001 A1 | 6/2019 | Danjo | |

FOREIGN PATENT DOCUMENTS

| | | | | | |
|---|---|---|---|---|---|
| JP | H06-324677 | A | | 11/1994 | |
| JP | 2005266080 | A | * | 9/2005 | |
| JP | 2014010190 | A | * | 1/2014 | ............... G10H 7/02 |
| JP | 2016-80868 | A | | 5/2016 | |
| JP | 2017-3625 | A | | 1/2017 | |
| JP | 2017003625 | A | * | 1/2017 | |
| JP | 2019-113764 | A | | 7/2019 | |

(Continued)

OTHER PUBLICATIONS

Takeoff (https://www.nicovideo.jp/watch/sm22396570, Dec. 5, 2013) (Year: 2013).*

(Continued)

*Primary Examiner* — Jianchun Qin

(74) *Attorney, Agent, or Firm* — CHEN YOSHIMURA LLP

(57) ABSTRACT

An electronic musical instrument includes: a plurality of keys that include at least first keys corresponding to a first pitch range and second keys corresponding to a second pitch range; and at least one processor, configured to perform the following: in accordance with a key operation in the first pitch range, determining a syllable position contained in a phrase; and in accordance with a key operation in the second pitch rang, instructing a sound production of a digitally synthesized sound corresponding to the determined syllable position.

9 Claims, 14 Drawing Sheets

(56) References Cited

FOREIGN PATENT DOCUMENTS

WO 2015/194423 A1 4/2017

OTHER PUBLICATIONS

Japanese Office Action dated Nov. 22, 2022, in a counterpart Japanese patent application No. 2020-150336. (A machine translation (not reviewed for accuracy) attached.).
U.S. Appl. No. 17/409,605, filed Aug. 23, 2021.
Office Action issued May 21, 2024 in U.S. Appl. No. 17/409,605 which has been cross-referenced to the instant application. Non Patent Literature Nos. 2-4 listed below were cited in that Office Action.
Boya (https:/lwww.nicovideo.jp/watch/sm22254895, Nov. 14, 2013) (Year: 2013).
Synthtopia (https://youtube/BEjKKd7dUzE, May 9, 2018) (Year: 2018).
Lumi (https://lweb.archive.org/web/20191204112307/https://playlumi.com/, Dec. 4, 2019) (Year: 2019).

* cited by examiner

ELECTRONIC MUSICAL INSTRUMENT, METHOD, AND STORAGE MEDIUM

BACKGROUND OF THE INVENTION

Technical Field

The present disclosure relates to an electronic musical instrument and its method.

Background Art

In recent years, the usage scene of synthetic voice has been expanding. Under such circumstances, if there is an electronic musical instrument that can not only perform automatic performance but also advance the lyrics according to the key press of the user (performer) and output the synthetic voice corresponding to the lyrics, more flexible synthetic voice expression becomes possible, which is preferable.

SUMMARY OF THE INVENTION

Manipulating the progress of a phrase (for example, lyrics) related to a performance with a dedicated controller requires complex user operations, and it is not easy to generate lyrics using synthetic voice with ease.

One of the purposes of the present disclosure is to provide an electronic musical instrument and its related method capable of appropriately controlling the progress of a phrase (for example, lyrics) involved in a performance.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides an electronic musical instrument comprising: a plurality of keys that include at least first keys corresponding to a first pitch range and second keys corresponding to a second pitch range; and at least one processor, configured to perform the following: in accordance with a key operation in the first pitch range, determining a syllable position contained in a phrase; and in accordance with a key operation in the second pitch rang, instructing a sound production of a digitally synthesized sound corresponding to the determined syllable position.

In another aspect, the present disclosure provides a method performed by at least one processor included in an electronic musical instrument that includes, in addition to the at least one processor, a plurality of keys that include at least first keys corresponding to a first pitch range and second keys corresponding to a second pitch range, the method comprising, via the at least one processor: in accordance with a key operation in the first pitch range, determining a syllable position contained in a phrase; and in accordance with a key operation in the second pitch rang, instructing a sound production of a digitally synthesized sound corresponding to the determined syllable position.

In another aspect, the present disclosure provides a non-transitory computer readable storage medium storing a program readable by at least one processor included in an electronic musical instrument that includes, in addition to the at least one processor, a plurality of keys that include at least first keys corresponding to a first pitch range and second keys corresponding to a second pitch range, the program instructing the at least one processor to perform the following: in accordance with a key operation in the first pitch range, determining a syllable position contained in a phrase; and in accordance with a key operation in the second pitch rang, instructing a sound production of a digitally synthesized sound corresponding to the determined syllable position.

It is to be understood that both the foregoing general description and the following detailed description are exemplary and explanatory, and are intended to provide further explanation of the invention as claimed.

DETAILED DESCRIPTION OF EMBODIMENTS

Figure 1:
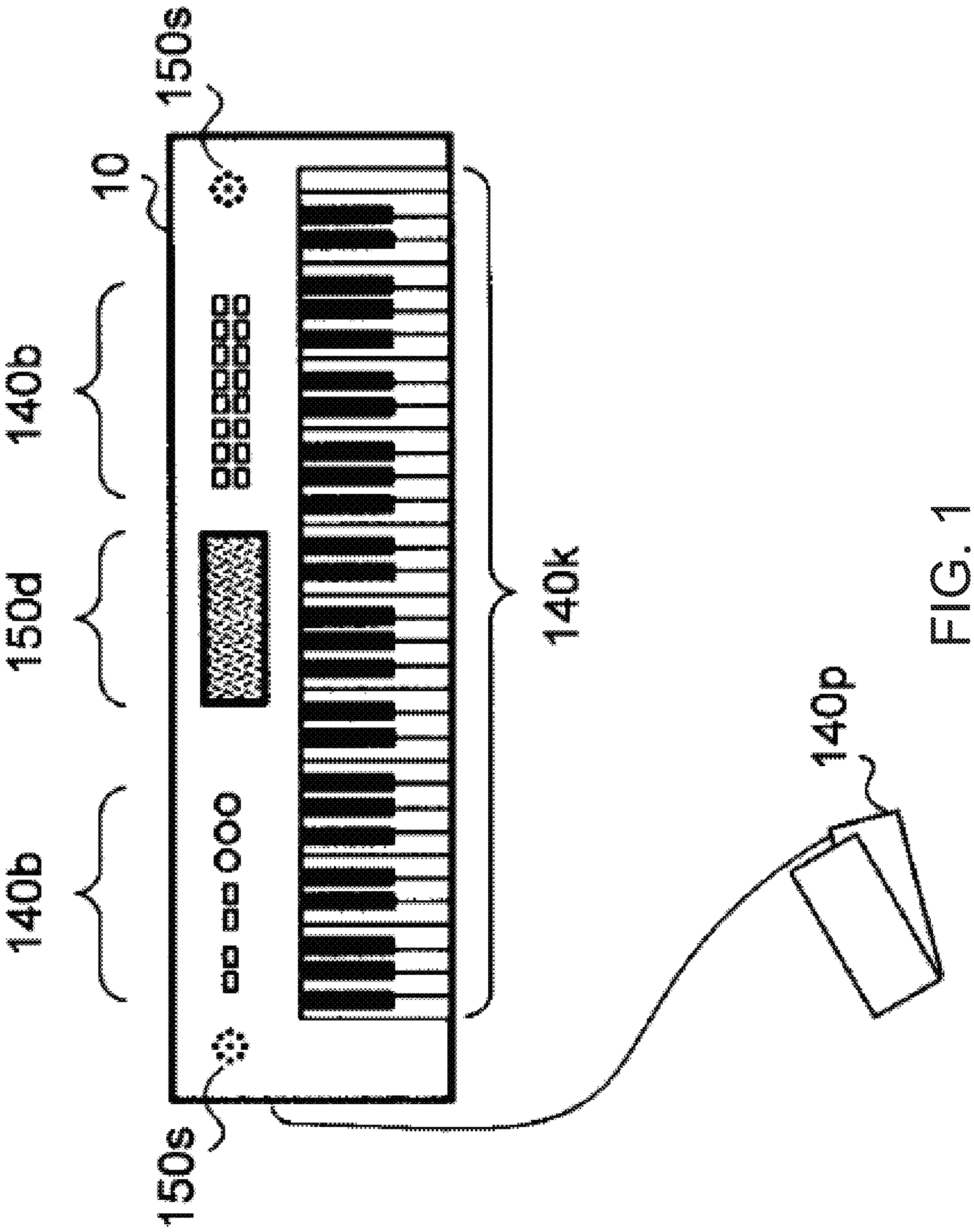
FIG. 1 is a diagram showing an example of the appearance of an electronic musical instrument 10 according to an embodiment.

Hereinafter, embodiments of the present disclosure will be described in detail with reference to the accompanying drawings. In the following description, the same parts are designated by the same reference numerals. Since the same part has the same name and function, detailed explanation will not be repeated.

(Electronic Musical Instrument)

FIG. 1 is a diagram showing an example of the appearance of the electronic musical instrument 10 according to an embodiment. The electronic musical instrument 10 may be equipped with a switch (button) panel 140*b*, a keyboard 140*k*, a pedal 140*p*, a display 150*d*, a speaker 150*s*, and the like.

The electronic musical instrument 10 is a device that controls performance, lyrics progression, and the like in response to input from a user via an operating element such as a keyboard or a switch. The electronic musical instrument 10 may be a device having a function of generating a sound according to performance information such as MIDI (Musical Instrument Digital Interface) data. The device may be an electronic musical instrument (electronic piano, synthesizer, etc.), or may be an analog musical instrument equipped with a sensor or the like and configured to have the function of the above-mentioned operating element.

The switch panel 140*b* may include switches for specifying a volume, a sound source, a tone color setting, a song (accompaniment) song selection (accompaniment), a song playback start/stop, a song playback setting (tempo, etc.), etc.

The keyboard 140*k* may have a plurality of keys as performance controls. The pedal 140*p* may be a sustain pedal having a function of extending the sound of the pressed keyboard while the pedal is being depressed, or may be a pedal for operating an effector that processes a tone, volume, or the like.

In the present disclosure, terms, such as a sustain pedal, the pedal, a foot switch, a controller (operating element), a switch, a button, a touch panel, and the like, may be interchangeable to mean the same thing or concept. The pedal depression in the present disclosure may be understood to mean an operation of an controller.

A key may be called a performance operating element, a pitch operating element, a tone operating element, a direct operating element, a first operating element, or the like. A pedal may be referred to as a non-playing operating element, a non-pitched operating element, a non-timbre operating element, an indirect operating element, a second operating element, or the like.

The display 150*d* may display lyrics, musical scores, various setting information, and the like. The speaker 150*s* may be used to emit the sound generated by the performance.

The electronic musical instrument 10 may be able to generate or convert at least one of a MIDI message (event) and an Open Sound Control (OSC) message.

The electronic musical instrument 10 may be referred to as a control device 10, a syllable progression control device 10, or the like.

The electronic musical instrument 10 is connected to a network (Internet, etc.) via at least one of wired and wireless communication schemes (for example, Long Term Evolution (LTE), 5th generation mobile communication system New Radio (5G NR), Wi-Fi (registered trademark), etc.).

The electronic musical instrument 10 may hold singing voice data (may be called lyrics text data, lyrics information, etc.) related to lyrics, whose progress is to be controlled, in advance, or may transmit and/or receive such singing voice data via a network. The singing voice data may be a text written in a musical score description language (for example, MusicXML), may be expressed in a MIDI data storage format (for example, Standard MIDI File (SMF) format), or may be expressed in a normal MIDI file (SMF) format. It may be the text given in a text file. The singing voice data may be singing voice data 215, which will be described later. In the present disclosure, singing voice, voice, sound, etc., may be interchangeably used to indicate the same thing/concept as the case may be.

Here, the electronic musical instrument 10 may acquire the content of the user singing in real time through a microphone or the like provided in the electronic musical instrument 10, and may acquire, as singing voice data, the text data obtained by applying the voice recognition process to the acquired content.

Figure 2:
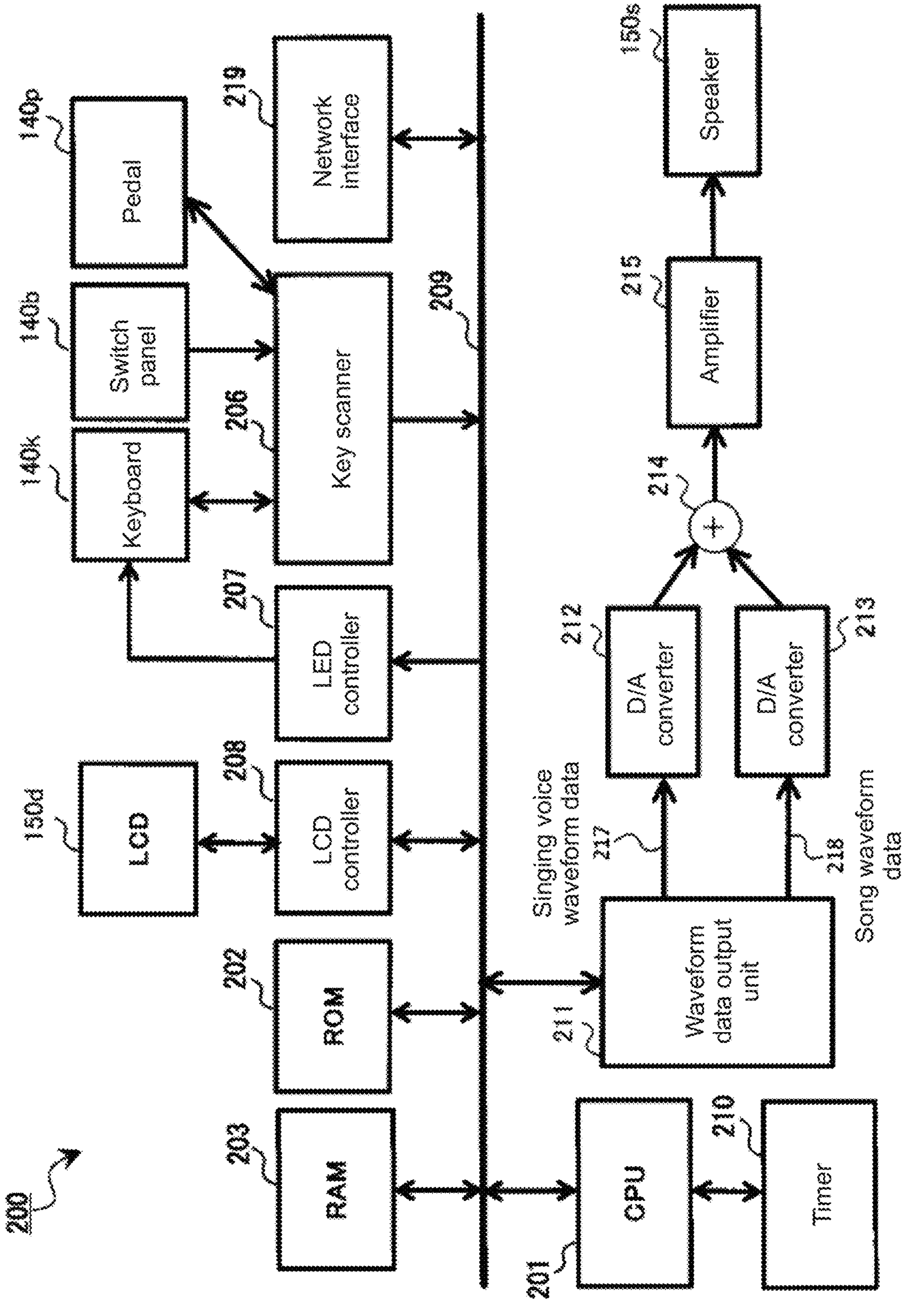
FIG. 2 is a diagram showing an example of the hardware configuration of the control system 200 of the electronic musical instrument 10 according to an embodiment.

FIG. 2 is a diagram showing an example of the hardware configuration of the control system 200 of the electronic musical instrument 10 according to the embodiment.

Central processing unit (CPU) 201, ROM (read-only memory) 202, RAM (random access memory) 203, waveform data output unit 211, a key scanner 206 to which switch (button) panel 140*b*, keyboard 140*k*, and pedal 140*p* in FIG. 1 are connected, and the LCD controller 208 to which an LCD (Liquid Crystal Display) as an example of the display 150*d* of FIG. 1 is connected are connected to the system bus 209, respectively.

A timer 210 (which may be called a counter) for controlling the performance may be connected to the CPU 201. The timer 210 may be used, for example, to count the progress of the automatic performance of the electronic musical instrument 10. The CPU 201 may be referred to as a processor, and may include an interface with peripheral circuits, a control circuit, an arithmetic circuit, a register, and the like.

The CPU 201 executes control operations of the electronic musical instrument 10 of FIG. 1 by executing the control program stored in the ROM 202 while using the RAM 203 as the work memory. In addition to the control program and various fixed data, the ROM 202 may store singing voice data, accompaniment data, song data including these, and the like.

The waveform data output unit 211 may include a sound source LSI (large-scale integrated circuit), a voice synthesis LSI, and the like. The sound source LSI and the voice synthesis LSI may be integrated into one LSI. A specific block diagram of the waveform data output unit 211 will be described later with reference to FIG. 3. A part of the processing of the waveform data output unit 211 may be performed by the CPU 201, or may be performed by a CPU included in the waveform data output unit 211.

The singing voice waveform data 217 and the song waveform data 218 output from the waveform data output unit 211 are converted into an analog singing voice sound output signal and an analog music sound output signal by the D/A converters 212 and 213, respectively. The analog music sound output signal and the analog singing voice sound output signal may be mixed by the mixer 214, amplified by the amplifier 215, and then output from the speaker 150*s* or an output terminal. The singing voice waveform data may be called singing voice synthesis data. Although not shown, the singing voice waveform data 217 and the song waveform data 218 may be digitally synthesized instead and then converted to analog by a single D/A converter to obtain the mixed signal.

The key scanner (scanner) 206 constantly scans the key pressing/releasing state of the keyboard 140*k* in FIG. 1, the switch operating state of the switch panel 140*b*, the pedal operating state of the pedal 140*p*, and the like, and interrupts the CPU 201 to report the states.

The LCD controller 208 is an IC (integrated circuit) that controls the display state of the LCD, which is an example of the display 150*d*.

This system configuration is an example, and is not limited to this. For example, the number of each circuit included is not limited to this. The electronic musical instrument 10 may have a configuration that does not include a part of circuits (mechanisms), or may have a configuration in which the functions of one circuit are realized by a plurality of circuits. It may have a configuration in which the functions of a plurality of circuits are realized by one circuit.

In addition, the electronic instrument 10 may be configured to include hardware such as a microprocessor, a digital signal processor (DSP: Digital Signal Processor), an ASIC (Application Specific Integrated Circuit), a PLD (Programmable Logic Device), and an FPGA (Field Programmable Gate Array). Such hardware may realize a part or all of respective functional blocks. For example, the CPU 201 may be implemented in the form of at least one of these hardware configurations.

<Generation of Acoustic Model>

Figure 3:
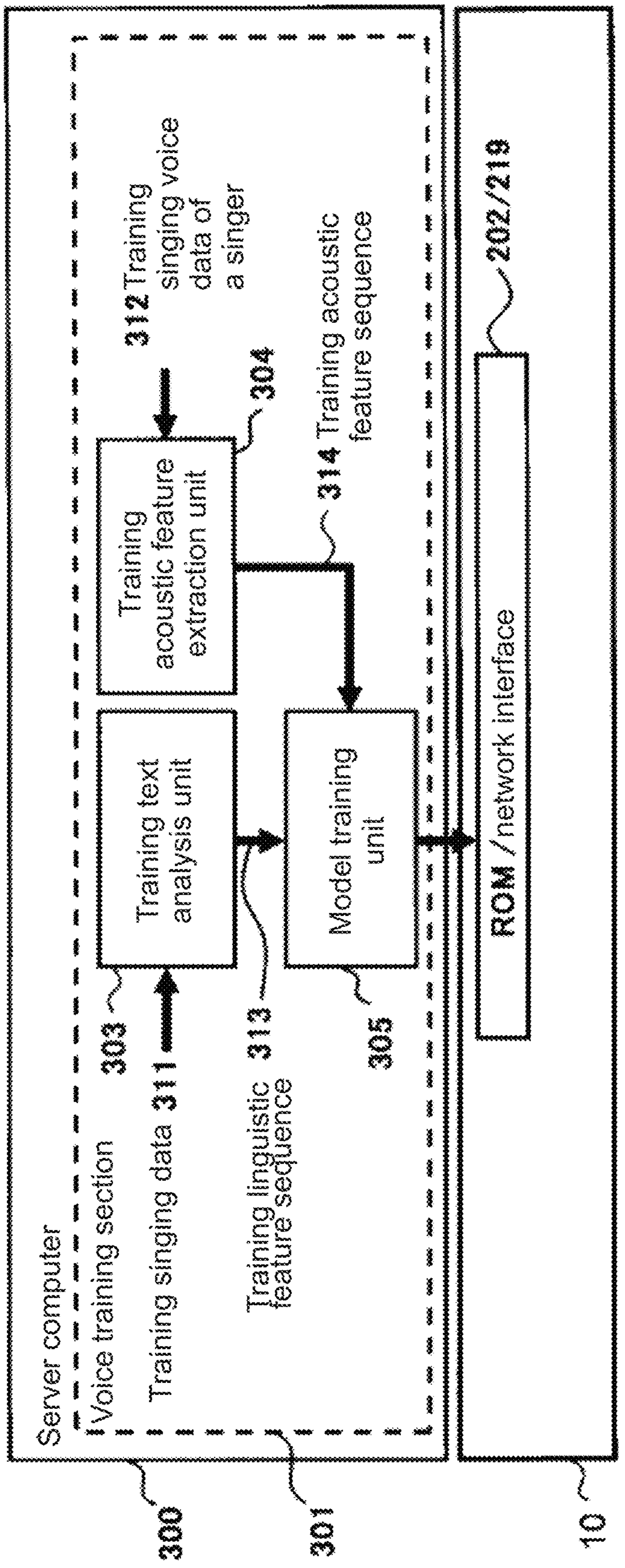
FIG. 3 is a diagram showing a configuration example of a voice learning unit 301 according to an embodiment.

FIG. 3 is a diagram showing an example of the configuration of a voice learning unit 301 according to an embodiment. The voice learning unit 301 may be implemented as a function executed by a server computer 300 existing outside the electronic musical instrument 10 of FIG. 1. Alternatively, the voice learning unit 301 may be built in the electronic musical instrument 10 as a function executed by the CPU 201, the voice synthesis LSI within the waveform data output unit 211, and the like.

The voice learning unit 301 and the waveform data output unit 211 that realize the voice synthesis in the present disclosure may be implemented, for example, based on a statistical voice synthesis technique based on deep learning.

The voice learning unit 301 may include a training text analysis unit 303, a training acoustic feature extraction unit 304, and a model learning unit 305.

In the voice learning unit 301, as the training singing voice data 312, for example, voice recordings of a plurality of songs of an appropriate genre sung by a certain singer is used. Further, as the training singing data 311, the lyrics text of each song is prepared.

The training text analysis unit 303 receives the training singing data 311 including the lyrics text and analyzes the data. As a result, the training text analysis unit 303 estimates and outputs the training language feature sequence 313, which is a discrete numerical sequence expressing phonemes, pitches, etc., corresponding to the training singing data 311.

The training acoustic feature amount extraction unit 304 receives and analyzes the training singing voice data 312, which is acquired through a microphone or the like by a certain singer singing the lyrics text corresponding to the training singing data 311 in synchronization with the input of the training singing data 311. As a result, the training acoustic feature extraction unit 304 extracts and outputs the training acoustic feature sequence 314 representing the voice features corresponding to the training singing voice data 312.

In the present disclosure, the training acoustic feature sequence 314 and the acoustic feature sequence, which will be described later, respectively include acoustic feature data (formant information, spectrum information, etc.) modeling a human vocal tract and vocal cord sound source data (which may be called sound source information) that models a human vocal cord. As the spectrum information, for example, mel-cepstrum, Line Spectral Pairs (LSP), and the like can be adopted. As the sound source information, a fundamental frequency (FO) indicating the pitch frequency of human voice and power values can be adopted.

The model learning unit 305 estimates (derives) by machine learning an acoustic model that maximizes the probability that the training acoustic feature sequence 314 is generated from the training language feature sequence 313. That is, the relationship between the language feature sequence that is text and the acoustic feature sequence that is voice is expressed by a statistical model called an acoustic model. The model learning unit 305 outputs model parameters representing an acoustic model calculated as a result of the machine learning as a learning result 315. Therefore, the acoustic model corresponds to a trained model.

HMM (Hidden Markov Model: Hidden Markov Model) may be used as the acoustic model expressed by the learning result 315 (model parameters).

The HMM acoustic model may learn how the characteristic parameters of the vocal cord vibration and vocal tract characteristics change over time when a singer utters lyrics along a certain melody. The HMM acoustic model may be a phoneme-based model of the spectrum, fundamental frequency, and their temporal structures, obtained from the training singing voice data.

The processing of the voice learning unit 301 of FIG. 3 in which the HMM acoustic model is adopted will be described. The model learning unit 305 in the voice learning unit 301 may be trained to be a HMM acoustic model that has the maximum likelihood based on the training language feature sequence 313 output by the training text analysis unit 303 and the training acoustic feature sequence 314 output by the training acoustic feature extraction unit 304.

The spectral parameters of the singing voice can be modeled by continuous HMM. On the other hand, since the log fundamental frequency (FO) is a variable-dimensional time series signal that takes a continuous value in the voiced section and has no value in the unvoiced section, it cannot be directly modeled by a normal continuous HMM or a discrete HMM. Therefore, using MSD-HMM (Multi-Space probability Distribution HMM), which is an HMM based on a probability distribution on multiple spaces corresponding to variable dimensions, as spectral parameters, mel-cepstrum is modeled as a multidimensional Gaussian distribution, the logarithmic basic frequency (FO) in the voiced section is modelled as a one-dimensional Gaussian distribution, and the FO in the unvoiced section is modelled as a Gaussian distribution in zero-dimensional space at the same time.

Further, it is known that the characteristics of phonemes constituting a singing voice fluctuate under the influence of various factors even if the phonemes have the same acoustic characteristics. For example, the spectrum of phonemes and the logarithmic fundamental frequency (FO), which are basic phoneme units, differ depending on the singing style and tempo, the lyrics before and after, the pitch, and the like. These factors that affect the acoustic features are called contexts.

In the statistical voice synthesis processing of one embodiment, an HMM acoustic model (context-dependent model) that takes into account the contexts may be adopted in order to accurately model the acoustic features of the voice. Specifically, the training text analysis unit 303 may take into account not only the phonemes and pitches for each frame, but also the phonemes immediately before and after, the current position, the vibrato immediately before and after, the accent, and the like in generating the training language feature sequence 313. In addition, decision tree-based context clustering may be used to improve the efficiency in context combinations.

For example, the model learning unit 305 may generate a state continuation length decision tree as the learning result 315 from the training language feature sequence 313 that corresponds to the contexts of a large number of phonemes related to the state continuation lengths that have been extracted by the training text analysis unit 303 from the training singing data 311.

Further, the model learning unit 305 may generate a mel-cepstrum parameter determination tree for determining the mel-cepstrum parameters as the learning result 315, from the training acoustic feature sequence 314 that corresponds to a large number of phonemes related to the mel-cepstrum parameters that have been extracted by the training acoustic feature extraction unit 304 from the training singing voice data 312.

Further, the model learning unit 305 may generate a logarithmic fundamental frequency determination tree for determining the fundamental frequency (FO) as the learning result 315 from the training acoustic feature sequence 314 corresponding to a large number of phonemes related to the log fundamental frequency (FO) that has been extracted by the training acoustic feature extraction unit 304 from the training singing voice data 312. Here, in generating the logarithmic fundamental frequency determination tree, the log fundamental frequencies (FO) in the voiced section and the unvoiced section may be modeled as one-dimensional and zero-dimensional Gaussian distributions, respectively, by the MSD-HMM adapted for variable dimensions.

Further, instead of or in addition to the acoustic model based on HMM, an acoustic model based on Deep Neural Network (DNN) may be adopted. In this case, the model learning unit 305 may generate, as the learning result 315, model parameters representing the nonlinear conversion function of respective neurons in the DNN that is built from the language features to the acoustic feature. With the DNN, it is possible to express the relationship between the linguistic feature sequence and the acoustic feature sequence by using complicated nonlinear transformation functions that are difficult to express with a decision tree.

Further, the acoustic model of the present disclosure is not limited to these, and any voice synthesis method may be adopted as long as it is a technique using statistical voice synthesis processing, such as an acoustic model combining HMM and DNN.

As shown in FIG. 3, the learning result 315 (model parameters) may be stored in the ROM 202 of the control system of the electronic musical instrument 10 of FIG. 2 at the time of shipment from the factory of the electronic musical instrument 10 of FIG. 1, for example, and may be loaded from the ROM 202 of FIG. 2 to the singing voice control unit 307 or the like described later in the waveform data output unit 211 when the power of the electronic musical instrument 10 is turned on.

Alternatively, as shown in FIG. 3, the learning result 315 may be downloaded to the singing voice control unit 307 in the waveform data output unit 211 from the outside, such as the Internet, via the network interface 219 by the performer operating the switch panel 140*b* of the electronic musical instrument 10.

<Voice Synthesis Based on Acoustic Model>

Figure 4:
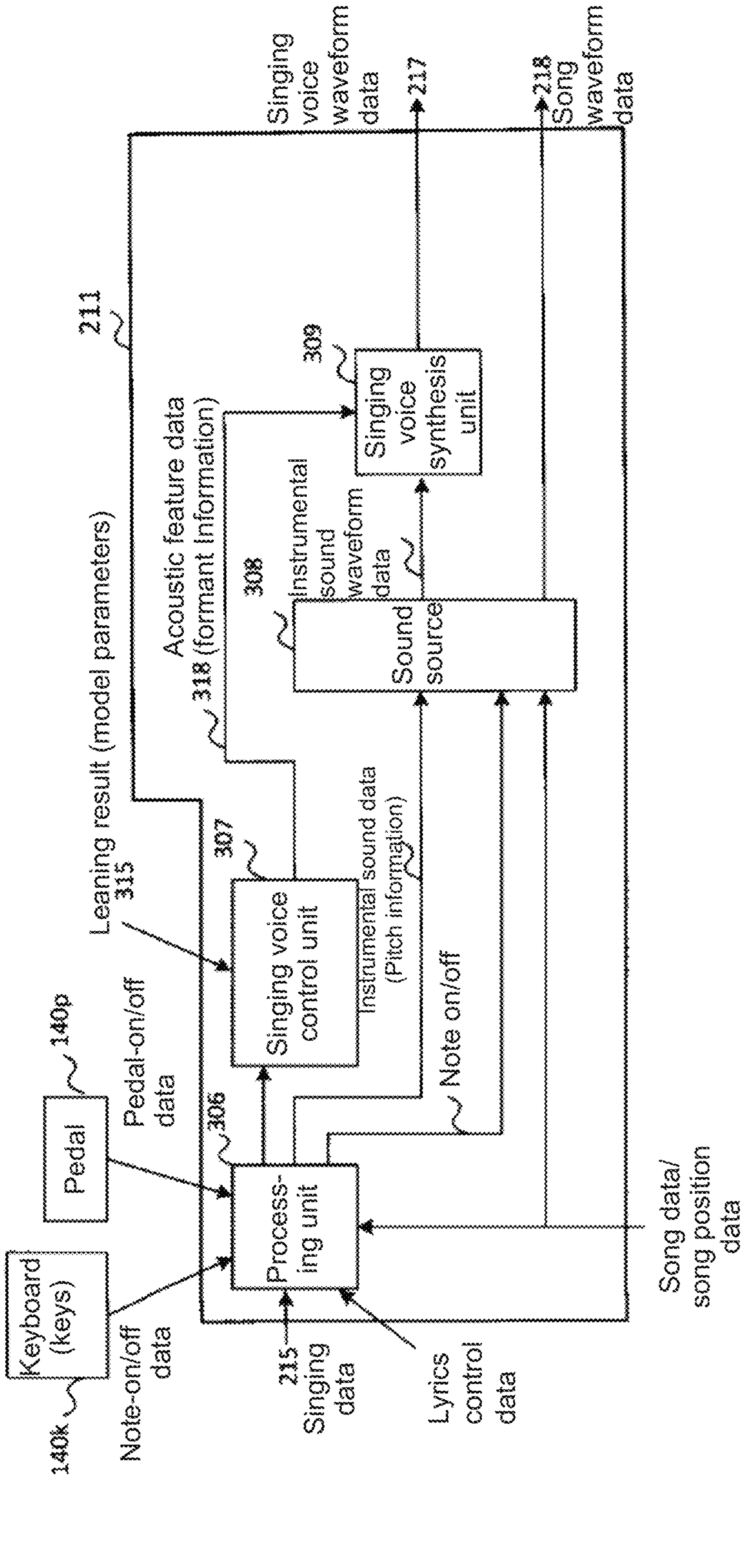
FIG. 4 is a diagram showing an example of the waveform data output unit 211 according to an embodiment.

FIG. 4 is a diagram showing an example of the waveform data output unit 211 according to an embodiment.

The waveform data output unit 211 includes a processing unit (which may be called a text processing unit, a preprocessing unit, etc.) 306, a singing voice control unit (which may be called an acoustic model unit) 307, a sound source 308, and a singing voice synthesis unit (which may be called an voice model unit) 309 and the like.

The waveform data output unit 211 receives the singing voice data 215, which includes lyrics and pitch information, and lyrics control data, which are instructed by the CPU 201 via the key scanner 206 of FIG. 2 based on the keys pressed on the keyboard 140*k* (operating elements) of FIG. 1, and synthesizes and outputs singing voice waveform data 217 corresponding to the lyrics and pitch. In other words, the waveform data output unit 211 executes statistical voice synthesis processing in which the singing voice waveform data 217 corresponding to the singing voice data 215 including the lyrics text is synthesized by predicting it using a statistical model called an acoustic model set in the singing voice control unit 307.

Further, when song data is to be outputted, the waveform data output unit 211 outputs the song waveform data 218 corresponding to the song playing position. Here, the song data may correspond to accompaniment data (for example, data such as pitch, timbre, and pronunciation timing for one or more sounds), accompaniment, and melody data, and may be called backtrack data and the like.

The processing unit 306 receives, for example, singing voice data (singing data) 215 including information on the phonemes, pitches, etc., of the lyrics designated by the CPU 201 of FIG. 2 as a result of the performer's performance (operation), and analyzes the data. The singing voice data 215 may include at least one of, for example, the data of the nth note (may be called the nth note, the nth timing, etc.) (for example, pitch data, note length data), the data of the nth lyric (or syllable) corresponding to the nth note, and data of the nth syllable.

For example, the processing unit 306 may determine whether to progress the lyrics based on the lyrics progress control method described later based on the note on/off data, pedal on/off data, etc., acquired from the operation of the keyboard 140*k* and the pedal 140*p*, and may acquire singing voice data 215 corresponding to the syllable (lyrics) to be output. Then, the processing unit 306 analyzes language feature sequence that expresses the phonemes, parts, words, etc., corresponding to the pitch data designated by the key press or the pitch data of the acquired singing voice data 215 and the character data of the acquired singing voice data 215, and outputs the language feature sequence to the singing voice control unit 307.

The singing voice data 215 may be information containing at least one of the lyrics (characters), the type of syllable (start syllable, middle syllable, end syllable, etc.), the corresponding voice pitch (correct voice pitch), and the lyrics (character string) of each syllable. The singing voice data 215 may include information on the singing voice data of the nth syllable corresponding to the nth (n=1, 2, 3, 4, . . . ) note, for example.

The singing voice data 215 may include information (data in a specific audio file format, MIDI data, etc.) for playing the accompaniment (song data) corresponding to the lyrics. When the singing voice data is presented in SMF format, the singing voice data 215 may include a track chunk in which data related to singing voice is stored and a track chunk in which data related to accompaniment is stored. The singing voice data 215 may be read from the ROM 202 into the RAM 203. The singing voice data 215 is stored in a memory (for example, ROM 202, RAM 203) before the performance.

The lyrics control data may be used for setting singing voice production information corresponding to a syllable, as will be described later with reference to FIG. 12. The waveform data output unit 211 can control the timing of sound production based on the singing voice production information. For example, the processing unit 306 may adjust the language feature sequence to be output to the singing voice control unit 307 based on the syllable start frame indicated by the singing voice production information (for example, the frame before the syllable start frame need not be output).

The singing voice control unit 307 estimates acoustic feature sequence corresponding to the language features sequence inputted from the processing unit 306 based on the language feature sequence and the acoustic model set as the learning result 315. The formant information 318 corresponding to the estimated acoustic feature sequence is output to the singing voice synthesis unit 309.

For example, when the HMM acoustic model is adopted, the singing voice control unit 307 concatenates the HMMs by referring to the decision tree for respective contexts obtained by the language feature sequence, and derives the acoustic feature sequence (formant information 318 and vocal cord sound source data 319) that has maximum output probability from the concatenated HMM.

When the DNN acoustic model is adopted, the singing voice control unit 307 may output the acoustic feature sequence in the unit of a designated frame with respect to the phoneme sequence of the language feature sequence that is input in the unit of the designed frame. The frame of the present disclosure may be, for example, 5 ms, 10 ms, or the like.

In FIG. 4, the processing unit 306 acquires musical instrument sound data (pitch information) corresponding to the pitch of the pressed key from the memory (may be ROM 202 or RAM 203) and outputs it to the sound source 308.

The sound source 308 generates a sound source signal (may be referred to as the instrument sound waveform data) of the instrumental sound data (pitch information) corresponding to the sound to be sounded (note-on) based on the note-on/off data input from the processing unit 306, and outputs the sound source signal to the singing voice synthesis unit 309. The sound source 308 may execute control processing such as envelope control of the sound to be produced.

The singing voice synthesis unit 309 forms a digital filter that models the vocal tract based on a series of formant information 318 sequentially input from the singing voice control unit 307. Further, the singing voice synthesis unit 309 uses the sound source signal input from the sound source 308 as an excitation source signal, applies the digital filter, and generates and outputs the singing voice waveform data 217 of the digital signal. In this case, the singing voice synthesis unit 309 may be called a synthesis filter unit.

Here, various voice synthesis methods such as a cepstrum voice synthesis method and an LSP voice synthesis method may be adopted for the singing voice synthesis unit 309.

In the example of FIG. 4, since the output singing voice waveform data 217 uses the musical instrument sound as the sound source signal, the fidelity is slightly lost as compared with the actual singing voice of the singer. But, effective singing voice waveform data 217 that has both instrumental sound feeling and the singing voice quality of the singer can be output.

The sound source 308 may operate to output in another channel the song waveform data 218 together with the processing of the instrumental sound wave data. As a result, the accompaniment sound can be produced with a normal instrument sound, or the instrument sound of the melody line can be produced and the singing voice of the melody can be produced at the same time.

Figure 5:
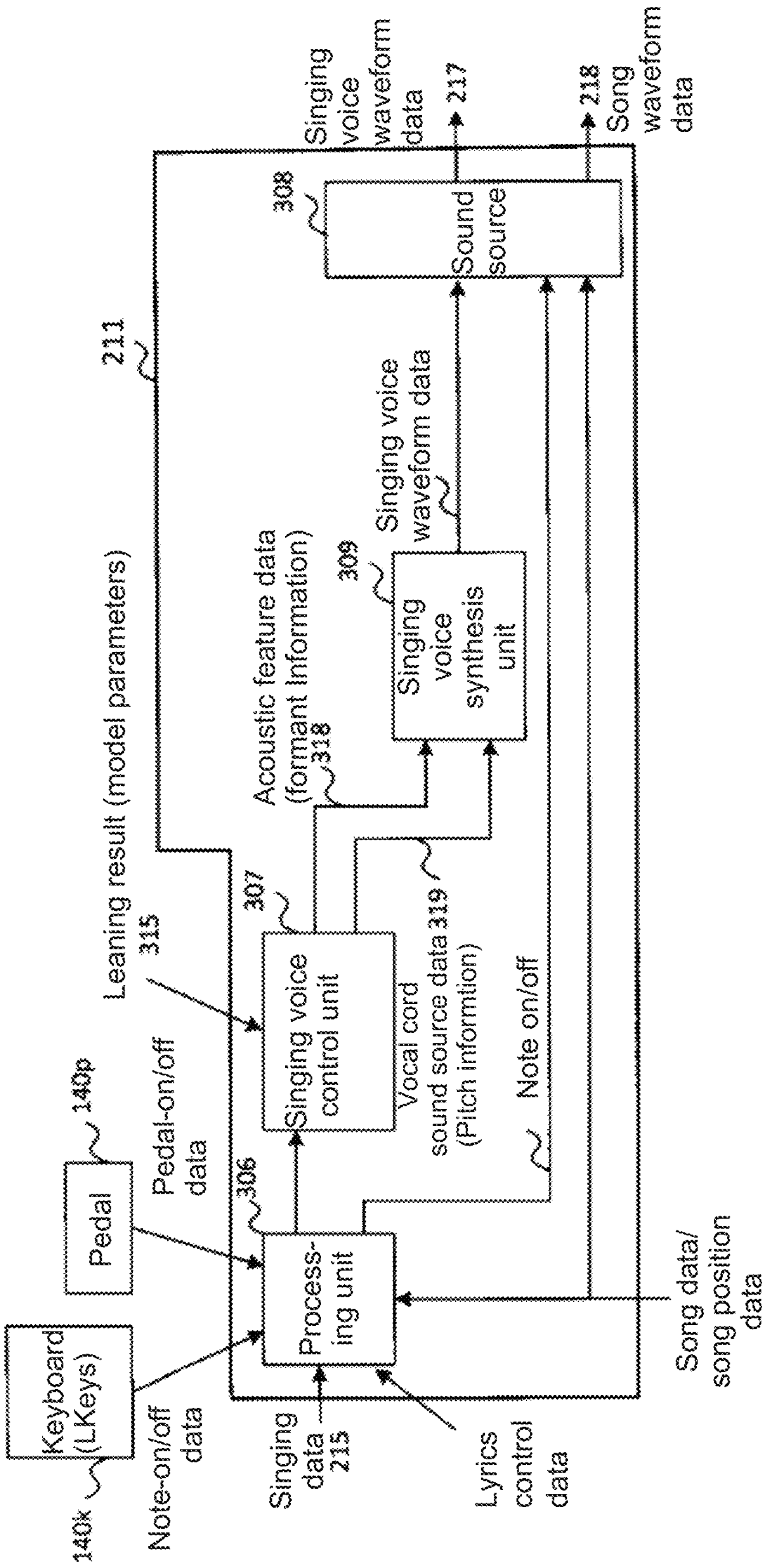
FIG. 5 is a diagram showing another example of the waveform data output unit 211 according to an embodiment.

FIG. 5 is a diagram showing another example of the waveform data output unit 211 according to an embodiment. The contents overlapping with FIG. 4 will not be repeatedly described.

As described above, the singing voice control unit 307 of FIG. 5 estimates the acoustic feature sequence based on the acoustic model. Then, the singing voice control unit 307 outputs the formant information 318 corresponding to the estimated acoustic feature sequence and the vocal cord sound source data (pitch information) 319 corresponding to the estimated acoustic feature sequence to the singing voice synthesis unit 309. The singing voice control unit 307 may estimate an estimated value of the acoustic feature sequence that maximizes the probability that the acoustic feature sequence is generated.

The singing voice synthesis unit 309 generates data (for example, the singing voice waveform data of the nth lyric corresponding to the nth note) for generating signals that are obtained by applying a digital filter modelling the vocal tract based on the sequence of the formant information 318 to a pulse train (in the case of voiced sound elements) that is periodically repeated with a fundamental frequency (FO) and power values included in the vocal cord sound source data 319 that is input from the singing voice control unit 307, or white noise (in the case of unvoiced phonetic elements) having power values contained in the vocal cord sound source data 319, or a signal mixing them, and output the data to the sound source 308.

The sound source 308 generates singing voice waveform data 217, which is a digital signal, from the singing voice waveform data of the nth lyrics corresponding to the sound to be pronounced (note-on) based on the note-on/off data input from the processing unit 306, and outputs the singing voice waveform data 217.

In the example of FIG. 5, the output singing voice waveform data 217 is a signal completely modeled by the singing voice control unit 307 because the sound generated by the sound source 308 based on the vocal cord sound source data 319 is used as the sound source signal. It is therefore possible to output singing voice waveform data 217 of a singing voice that is very faithful to the singing voice of the singer and that sounds natural.

In this way, the voice synthesis of the present disclosure is different from the existing vocoder (a method of inputting words spoken by a human with a microphone and replacing them with musical instrument sounds), and the user (performer) does not have to actually sing. In other words, the synthetic voice can be output by operating the keyboard without inputting the voice signal to be pronounced by the user in real time to the electronic musical instrument 10.

As described above, by adopting the technique of statistical voice synthesis processing as the voice synthesis method, it is possible to realize a much smaller memory capacity as compared with the conventional element piece synthesis method. For example, an electronic musical instrument of the concatenative synthesis method requires a memory having a storage capacity of several hundred megabytes for audio unit data, but in the present embodiment, in order to store the model parameters of the learning result 315, a memory with a storage capacity of only a few megabytes is only needed. Therefore, it is possible to realize a lower-priced electronic musical instrument, and it is possible to have a wider user group use a high-quality singing voice performance system.

Further, in the conventional voice unit data method, since the voice unit data needs to be manually adjusted, it takes a huge amount of time (yearly) and labor to create the data for singing voice performance. Creating the model parameters of the training result 315 for the HMM acoustic model or the DNN acoustic model requires only a fraction of the creation time and effort because there is almost no need to adjust the data. This also makes it possible to realize a lower-priced electronic musical instrument.

In addition, general users can train the electronic music instrument so that it learns his/her own voice, family voice, celebrity voice, etc., by using the learning function built in the server computer 300, which may be available as a part of cloud services, or in the voice synthesis LSI in the waveform data output unit 211, etc., so that the electronic music instrument can play a singing voice as the model. In this case as well, it is possible to realize a low-priced electronic music instrument that can provide singing voice performance that is much more natural and that has a higher sound quality than the conventional instruments.

(Lyrics Progress Control Method)

The lyrics progress control method according to an embodiment of the present disclosure will be described below. The lyrics progression control of the present disclosure may be referred to as performance control, performance, and the like as well.

The primary operation unit (electronic musical instrument 10) of each of the following flowcharts is the CPU 201, the waveform data output unit 211 (or the sound source LSI inside it, the voice synthesis LSI 205 (processing unit 306, singing voice control unit 307, sound source 308, singing voice synthesis unit 309, etc.)), or any combination thereof. For example, the CPU 201 may execute the control processing program loaded from the ROM 202 into the RAM 203 to execute each operation.

An initialization process may be performed at the start of the flow shown below. The initialization process may include interrupt processing, lyrics progression, derivation of TickTime, which is the reference time for automatic accompaniment, tempo setting, song selection, song reading, instrumental sound selection, and other processing related to buttons, etc.

The CPU 201 can detect operations of the switch panel 140*b*, the keyboard 140*k*, the pedal 140*p*, and the like based on the interrupt from the key scanner 206 at an appropriate timing, and can perform the corresponding processing.

In the following, an example of controlling the progress of lyrics is shown, but the target of progress control is not limited to this. Based on this disclosure, for example, instead of lyrics, the progress of arbitrary character strings, sentences (for example, news scripts) and the like may be controlled. That is, the lyrics of the present disclosure may correspond to characters, character strings, and the like.

First, the outline of the method of controlling the syllable position of lyrics (which may be called lyric, phrase, etc.) in the present disclosure will be described. With this the control method, lyrics can be controlled quickly and intuitively using the keyboard. In the present disclosure, "syllable" indicates one word (or one character) such as "go", "for", "it", etc., and "lyrics" or "phrase" means words (or sentence) consisting of a plurality of syllables or a plurality of words (or a plurality of letters), such as "Go for it." But these definitions are flexible.

Further, in the present disclosure, the syllable position may be represented by a specific index (for example, referred to as a syllable index). The syllable index may be a variable indicating the positional number of the syllable included in the lyrics as the syllables (or characters) are counted from the beginning. In the present disclosure, the syllable position and the syllable index may be used interchangeably to mean the same concept.

In the present disclosure, the lyric corresponding to one syllable index may correspond to one or more characters constituting one syllable. A syllable may include various syllables such as a vowel only, consonants only, consonants plus vowels, and the like.

Figure 6:
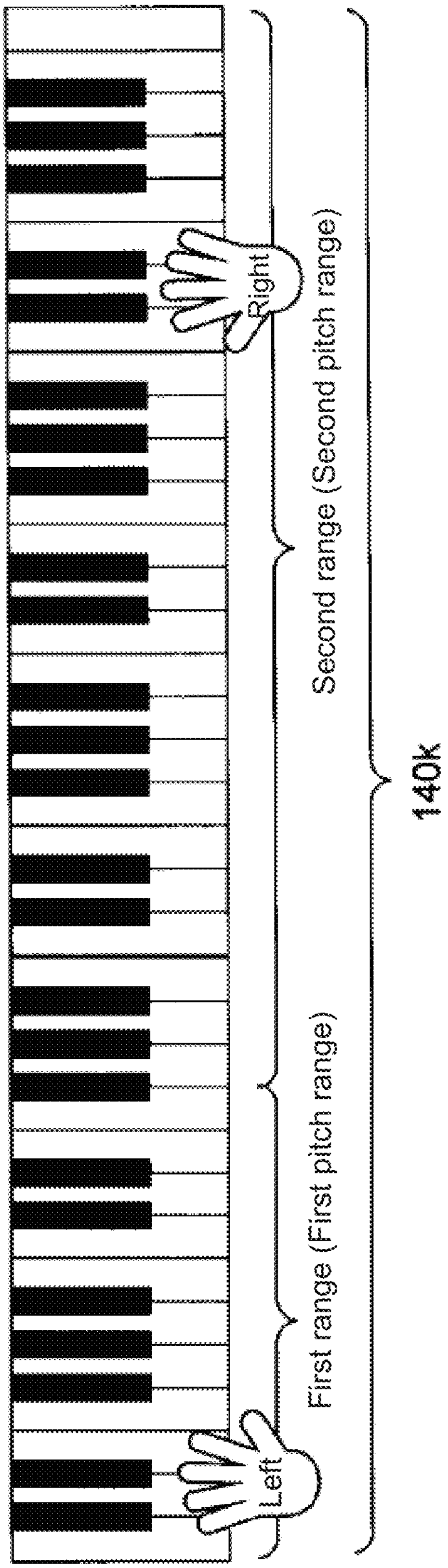
FIG. 6 shows an example of key range division of the keyboard for controlling the syllable position according to an embodiment.

FIG. 6 is a diagram showing an example of key range division of the keyboard for controlling the syllable position according to an embodiment. In this example, the keyboard 140*k* is divided into a first key range (first pitch range) and a second key range (second pitch range). That is, the keyboard 140*k* includes a plurality of keys including a plurality of first keys corresponding to the first pitch range and a plurality of second keys corresponding to the second pitch range. Although this example shows an example in which the number of keys of the keyboard 140*k* is 61, the embodiment of the present disclosure can be similarly applied to other numbers of keys.

In the present disclosure, the key range may be referred to as a keyboard region (or range), a performance operating element region (or range), a range, a sound range (or range), and the like.

The first key range may be referred to as a syllable position control key range, a keyboard control key range, or simply a control key range, and is used to specify a syllable position. In other words, the control key range does not have to be used to specify the pitch, velocity, length, etc., for performance.

As an example, the control key range may correspond to the key range of the keys for chord sounding (for example, C1-F2). In the control key range, the key used for controlling the syllable position may be composed of only the white keys, only the black keys, or both of them. For example, when only the white keys are used to control the syllable position, the black keys in the control key range may be used to control the lyrics (for example, transition to the next/previous lyrics in a song).

The second key range may be referred to as a keyboard performance key range, simply a playing key range, or the like, and is used to specify pitch, sound velocity, length, and the like. The electronic musical instrument 10 produces a sound corresponding to a syllable position (or lyrics) specified by operations in the control key range, using a pitch (pitch), velocity, or the like specified by operations in the playing key range.

Note that FIG. 6 shows an example in which the control key range is composed of some keys on the left hand side and the playing key range is composed of keys that do not correspond to the control key range, but the present invention is not limited to this. For example, each key range may be composed of non-adjacent (separate) keys, or the control key range may be composed of keys on the right handed side and the playing key range may be composed of keys on the left handed side.

Figure 7A:
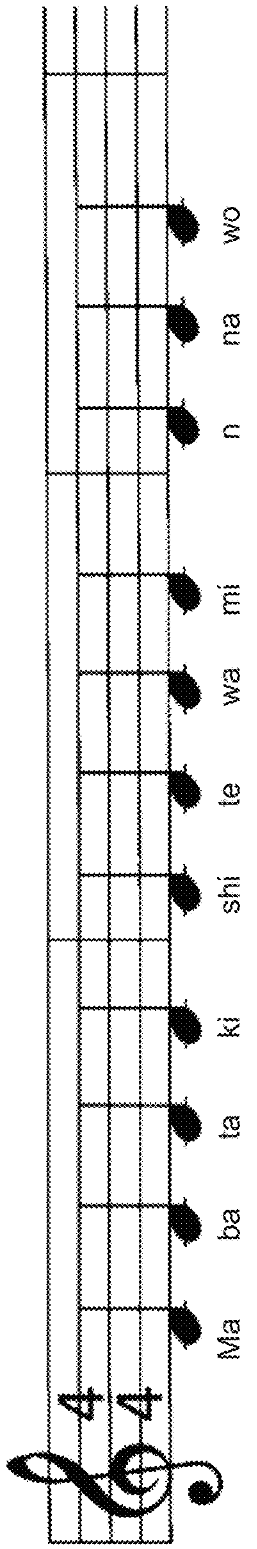
FIGS. 7A-7C are diagrams showing examples of syllables assigned to the control key range.
Figure 7B:
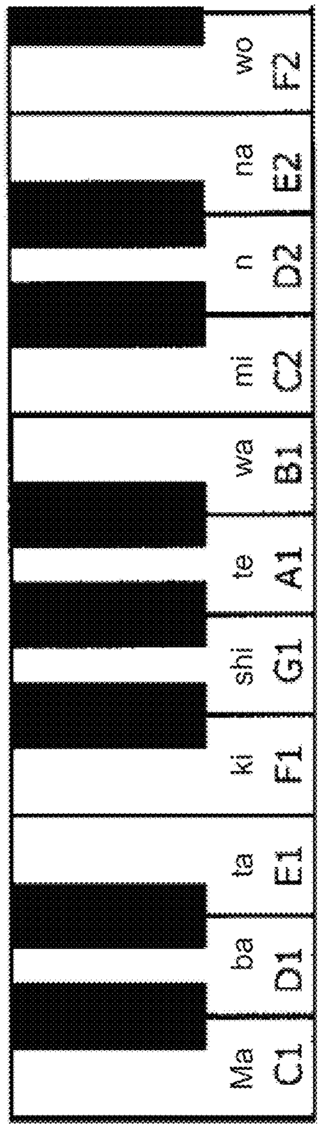
Figure 7C:
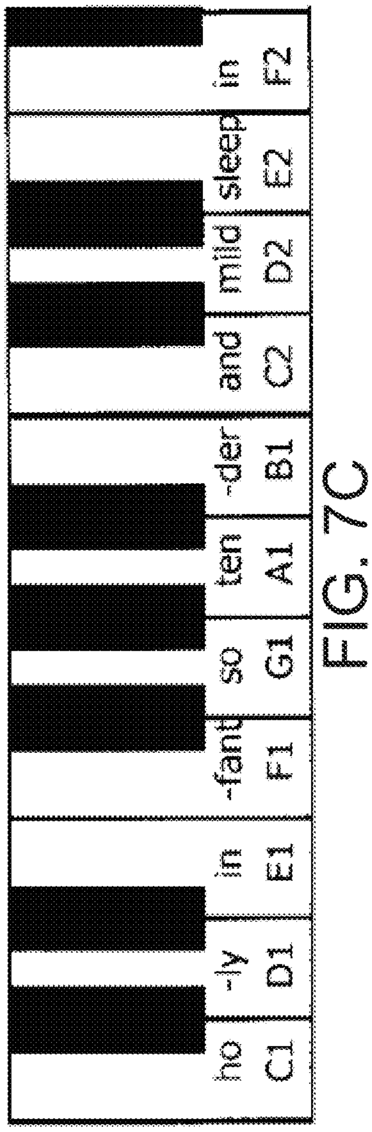

FIGS. 7A-7C are diagrams showing examples of syllables assigned to the control key range. FIG. 7A shows an example of lyrics for which the syllable position is controlled in the control key range. The lyrics "Ma ba to ki shi to wa mi n na wo" are shown. The pitch and the length of the note are examples, and the notes that are actually output can be controlled by the playing key range.

FIG. 7B shows an example in which respective syllables of the lyrics of FIG. 7A are assigned to white keys in the control key range. In this example, one syllable of the above lyrics is mapped to one of a total of 11 white keys of C1-F2 in the control key range.

When a white key in the control key range is pressed, the electronic musical instrument 10 sets the syllable position to the position corresponding to the pressed white key (for example, if the white key is G1, it is set to "shi"). When C1 is pressed, the electronic musical instrument 10 goes to the beginning of the lyrics regardless of the current syllable position (set the syllable position to "ma").

The electronic musical instrument 10 shifts the syllable position by one (moves to the next) when any key in the playing key range is pressed while a key in the control key range is not pressed. For example, if the prior position is "ma", it shifts to "ba". When the syllable position reaches the end of the lyrics, the syllable position may be changed to the beginning position of the lyrics ("ma" in FIG. 7B), or to the beginning position of the next lyrics.

The electronic instrument 10 maintains the syllable position at the position corresponding to the pressed white key in the control key range even if any key(s) in the playing key range are pressed a plurality of times while that white key in the control key range is being pressed. For example, if the position corresponding to the pressed white key in the control key range is "shi", "shi" is pronounced each time any key in the playing key range is pressed while that white key is being pressed.

When a white key in the control key range is anew pressed while a key in the playing key range is being pressed, the electronic instrument 10 may produce a syllable corresponding to that newly pressed white key in the control key range based on the pressed key in the playing key range. For example, keys are pressed in the control key range in the order of C2→D1→E1 while a key in the playing key range is pressed, the electronic instrument 10 produces "Mi, Ba, Ta" at the pitch specified by the pressed key in the playing key range. According to this operation, the syllables of the lyrics corresponding to the control key range can be produced in any order (anagrams can be freely created).

FIG. 7C is another example in which syllables of another lyrics (English lyrics) are assigned to white keys in the control key range. In this example, the syllables of the lyrics "holy infant so tender and mild sleep in" are mapped to a total of 11 white keys of C1-F2 in the control key range. In this way, syllables of any language may be assigned.

As shown in FIGS. 7B and 7C, one character/one syllable may be assigned to one key, or a plurality of characters/a plurality of syllables may be assigned to one key.

The data related to lyrics and syllables may correspond to the above-mentioned singing voice data 215 (may be referred to as lyrics data, syllable data, etc.). For example, the electronic musical instrument 10 may store a plurality of lyrics data in a memory, and may select one lyrics data when a specific function key (for example, a button, a switch, etc.) is operated.

<Lyrics Progress Control>

Figure 8:
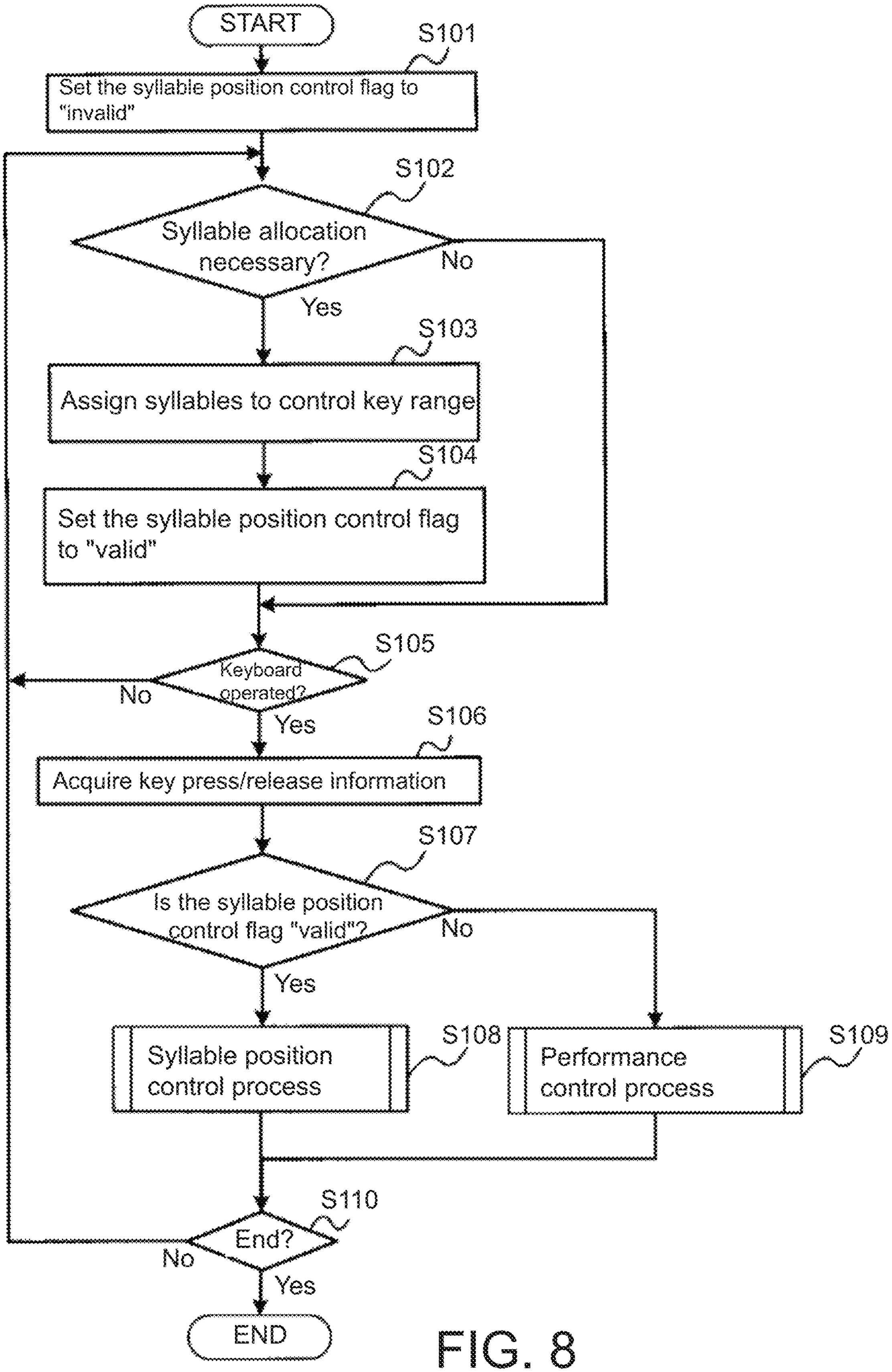
FIG. 8 is a diagram showing an example of a flowchart of the lyrics progression control method according to an embodiment.

FIG. 8 is a diagram showing an example of a flowchart of the lyrics progression control method according to an embodiment.

First, the electronic musical instrument 10 sets the syllable position control flag to "invalid" as an initial value (step S101).

The electronic musical instrument 10 determines whether or not syllable allocation is necessary (step S102). The electronic musical instrument 10 may determine that syllable allocation is needed when a specific function key (for example, a button, a switch, etc.) of the electronic musical instrument 10 is operated (and if lyrics, etc., are loaded, for example).

When syllable allocation is required (step S102—Yes), the electronic musical instrument 10 performs syllable allocation processing (step S103) for the control key range (white keys), and sets the syllable position control flag to "valid" (step S104). As described above, one syllable to be assigned may be selected from a plurality of lyrics data. When the syllable position control flag is "valid", it may be said that the keyboard split is valid.

When syllable assignment is not required (step S102—No), the control key range is not set and all keys are used to specify the pitch (normal performance mode). If the syllable position control flag is "invalid", it may be said that the keyboard split is invalid.

After step S104 or step S102—No, the electronic musical instrument 10 determines whether or not there is any keyboard operation (step S105). When there is a keyboard operation (step S105—Yes), the electronic musical instrument 10 acquires information on a key that is pressed/has been pressed and a key that is released/has been released, or the like (this information may be referred to as key pressing/releasing information) (step S106).

After step S106, the electronic musical instrument 10 confirms whether or not the above-mentioned syllable position control flag is valid (step S107). When the syllable position control flag is valid (step S107—Yes), the syllable position control process is performed (step S108). If not (step S107—No), the electronic musical instrument 10 performs a performance control process (step S109). The syllable position control process is shown in FIG. 9, and the performance control process is shown in FIG. 10, which will be described later.

After step S108 or step S109, the electronic musical instrument 10 determines whether or not the production of the lyrics is completed (step S110). When finished (step S110—Yes), the electronic musical instrument 10 may finish the process of the flowchart and return to the standby state. If not (step S110—No), the process may return to step S102 or step S105. Here, "whether the lyrics have been produced" may be related to the production of the lyrics of one phrase or the production of the lyrics of the entire song.

<Syllable Position Control>

Figure 9:
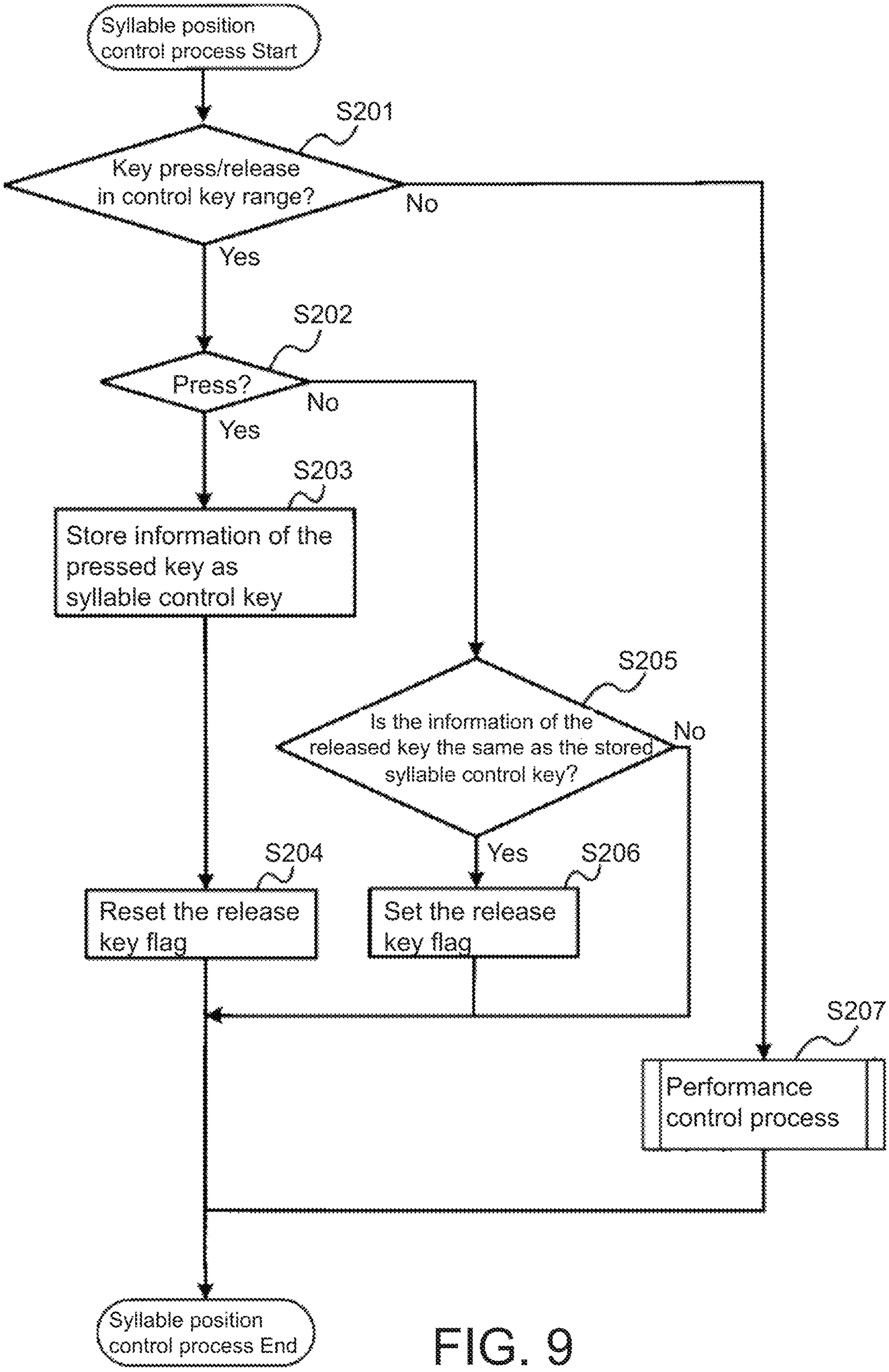
FIG. 9 is a diagram showing an example of a flowchart of the syllable position control process according to an embodiment.
Figure 10:
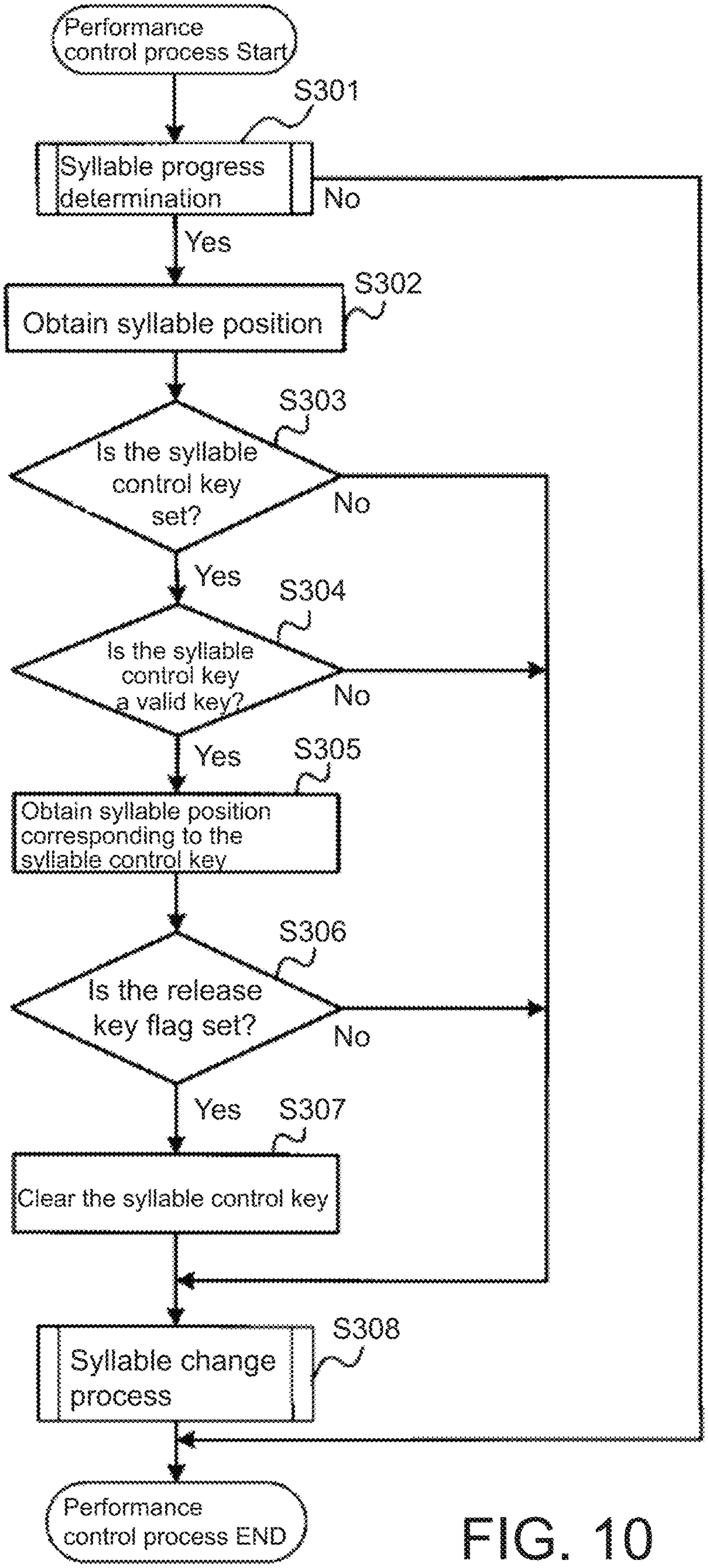
FIG. 10 is a diagram showing an example of a flowchart of the performance control process according to an embodiment.

FIG. 9 is a diagram showing an example of a flowchart of the syllable position control process according to an embodiment.

The electronic musical instrument 10 determines whether or not there is a key pressing/releasing operation in the control key range (step S201). When there is an operation in the control key range (step S201—Yes), it is determined whether or not the operation is a key press operation (step S202).

When there is a key pressing operation (step S202—Yes), the electronic musical instrument 10 stores (or records or sets) the information of the key pressed by the key pressing operation as a syllable control key (step S203). Further, the electronic musical instrument 10 resets (or does not set) the release key flag (step S204). The release key flag is reset when any key in the control key range is pressed, and is set otherwise.

On the other hand, when there is a key release operation (step S202—No), the electronic musical instrument 10 determines whether or not the information of the key released by the key release operation is the same as the stored syllable control key (step S205).

When the information of the released key is the same as the stored syllable control key (step S205—Yes), the release key flag is set (step S206). Even if the information of the released key is the same as the stored syllable control key, if there is a key that is still being pressed in the control key range, the electronic musical instrument 10 may store the information of the key still pressed as a syllable control key, and in this case, the release key flag may not be set.

On the other hand, when there is no operation in the control key range (step S201—No), the electronic musical instrument 10 performs the performance control process (step S207). The performance control process in step S207 may be the same as the performance control process in step S109.

After step S204, step S206, step S205—No, or step S207, the electronic musical instrument 10 may end the syllable position control process.

The syllable control key may be regarded as syllable control information, may be information on the key number (key number) of the pressed/released key, or may be information on the pressed/released key, or may be pitch information (or note number) of the pressed/released key. Hereinafter, in the present disclosure, a key number is held as a syllable control key as an example, but the present invention is not limited to this.

For example, the keys corresponding to C1-F2 in the examples of FIGS. 7B and 7C may correspond to the key numbers of 0-11, respectively. The key number may be a character string representing a pitch (for example, C1, F2).

According to the syllable position control process of FIG. 9, when there is a key pressed in the control key range, that key is held. If there is a release key in the control key range, the release key flag is set while maintaining the held key. The held key is replaced with another key in the control key range when another key is pressed in the control key range. If a new key in the control key range is pressed while a key in the control key range is not released, the held key may be overwritten with the new key.

<Performance Control>

FIG. 10 is a diagram showing an example of a flowchart of the performance control process according to an embodiment.

The electronic musical instrument 10 performs a syllable progression determination process (step S301). The syllable progression determination process returns a determination result (return value) regarding whether or not to advance the syllable position. If the determination result is Yes (or True), the current syllable position is acquired and the syllable position is transitioned (or shifted, advanced) by one (in other words, the lyrics are advanced) (step S302). An example of the syllable progression determination process will be described later with reference to FIG. 11.

On the other hand, when the determination result of the syllable progression determination process in step S301 is No (or False), the syllable position is not changed.

After step S302, the electronic musical instrument 10 determines whether or not the syllable control key is set (valid value is stored) (step S303). When the syllable control key is set (step S303—Yes), the electronic musical instrument 10 determines whether or not the syllable control key is a syllable position designation valid key (may be simply called a valid key) (step S304).

Here, the valid key may mean a key to which a syllable is assigned among all the keys in the control key range. For example, if the number of syllables contained in the current lyrics is less than the number of white keys in the control key range, some white keys in the control key range correspond to valid keys, and the rest do not correspond to valid keys. Also, in this case, black keys are not valid keys.

As you can see, if the lyrics change, which key will be the valid key can also change. It is not necessary for one key to have a one-to-one correspondence with one syllable, and one key may correspond to a plurality of syllables, or a plurality of keys may correspond to one syllable.

When the syllable control key is a valid key (step S304—Yes), the electronic musical instrument 10 acquires the syllable position corresponding to (the key number of) the syllable control key (step S305).

After step S305, the electronic musical instrument 10 determines whether the release key flag is set (step S306). When the release key flag is set (step S306—Yes), the electronic musical instrument 10 clears the syllable control key (an invalid value may be set) (step S307).

After step S303—No, step S304—No, step S306—No, or step S307, the electronic musical instrument 10 performs a syllable change process (step S308). An example of the syllable change process will be described later with reference to FIG. 12. As will be described later, the syllable production (outputting) process may be performed in the syllable change process.

Before or after the syllable change process, the electronic musical instrument 10 may store the current syllable position (the syllable position acquired (or acquired and advanced by one) in step S302 or step S305) as the current syllable position in a storage unit. The acquisition of the syllable position in step S302 may be the acquisition of the current syllable position stored. Further, instead of advancing the syllable position by one in step S302, the syllable position may be advanced by one before or after the syllable change process in step S308.

After step S301—No or step S308, the electronic musical instrument 10 may end the performance control process.

<Syllable Progression Determination>

Figure 11:
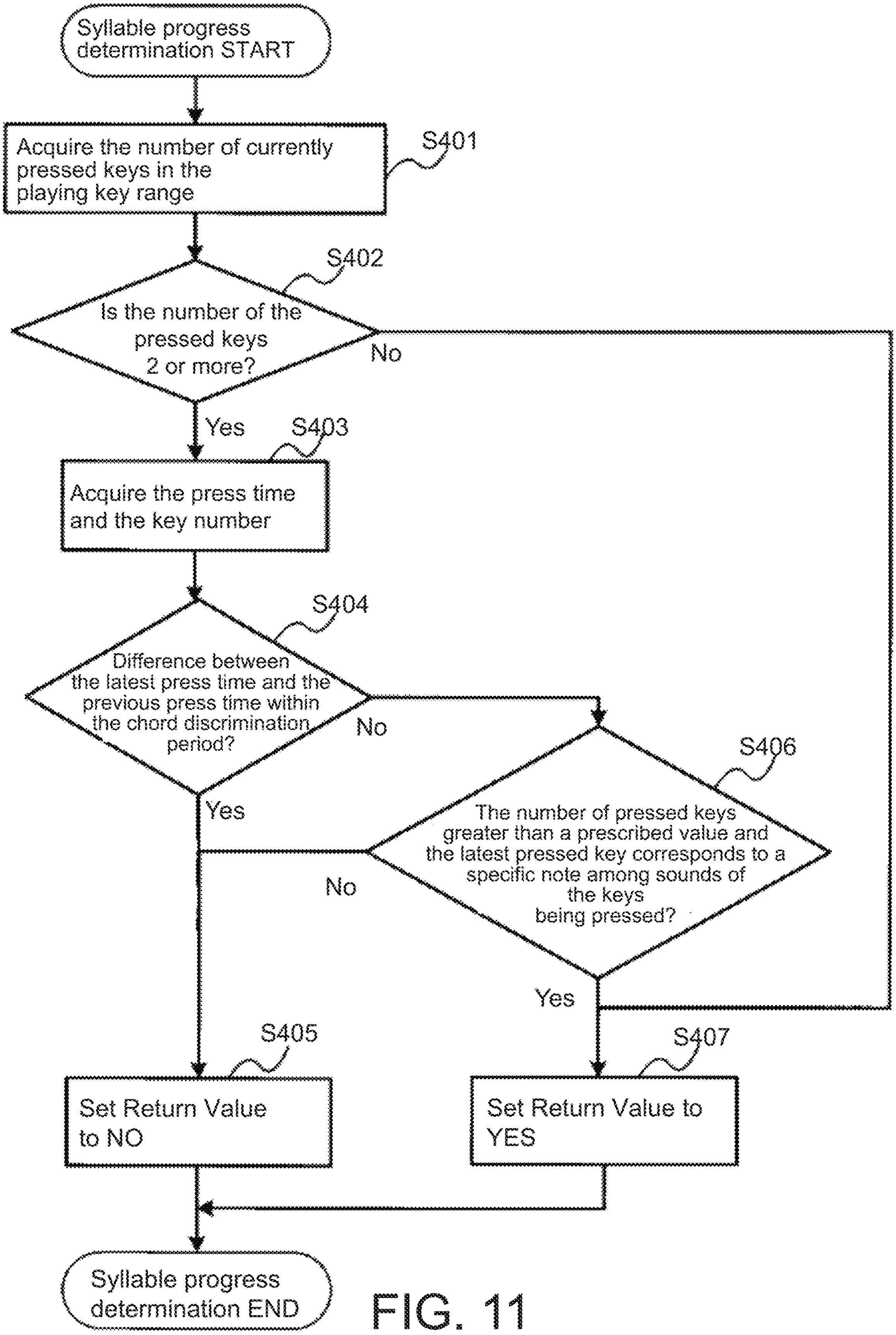
FIG. 11 is a diagram showing an example of a flowchart of the syllable progression determination process according to an embodiment.

FIG. 11 is a diagram showing an example of a flowchart of the syllable progression determination process according to an embodiment. This process advances the syllable if a single note is pressed in the playing key range, and if a chord is pressed in the playing key range, this process make a syllable progress determination based on which note (or height) in the chord (the number of the height or part) changes due to the key pressing.

The electronic musical instrument 10 acquires the current number of the pressed keys in the playing key range (step S401).

Next, the electronic musical instrument 10 determines whether the current number of the pressed keys in the playing key range is 2 or more (whether there are two or more keys pressed) (step S402). When the current number of the key presses is 2 or more (step S402—Yes), the electronic musical instrument 10 acquires the key press time and the key number corresponding to each key press (step S403).

After step S403, the electronic musical instrument 10 determines whether or not the difference between the latest key press time and the previous key press time is within the chord discrimination period (step S404). Step S404 may be regarded as a step of determining whether the difference between the key pressing time of the newly pressed sound and the key pressing time of the previously pressed sound (or i times before (i is an integer)) is within the chord discrimination period. It is preferable that the previous key press time corresponds to a key in which the key pressing is continued even at the latest key pressing time.

Here, the chord discrimination period is a time period with which a plurality of sounds produced within the time period are determined to form a chord (i.e., simultaneously played), and a plurality of sounds produced outside the time period are determined to be independent sounds (for example, melody line sounds) or distributed chords. The chord discrimination period may be expressed in units of milliseconds or microseconds, for example.

The chord discrimination period may be obtained from the input of the user, or may be derived based on the tempo of the song. The chord discrimination period may be referred to as a predetermined set time, set time, or the like.

When the difference between the latest key press time and the previous key press time is within the chord discrimination period (step S404—Yes), the electronic musical instrument 10 judges that the pressed sounds forms a simultaneous chord (a chord is specified), and determines that the syllable should be maintained (the lyrics do not progress). Then, the return value of the syllable progress determination process is set to No (or False) (step S405).

According to the determination in step S404, when a plurality of keys are pressed with the intention of a chord, the syllable does not advance in accordance with the number of keys, and instead only one lyric is advanced, which is desirable.

On the other hand, when there is no past key press time within the chord discrimination period (step S404—No), it is determined whether the current number of the pressed keys in the playing key range is equal to or greater than a predetermined value, and whether the latest key pressed corresponds to a specific note (key) among all the sounds (keys) pressed in the playing region (step S406). Here, in the case of step S404—No, the electronic musical instrument 10 may determine that the chord designation has been canceled, or may determine that the chord is not designated.

The predetermined number may be, for example, 2, 4, 8, or the like. Further, the specific note (key) may be the lowest note (key) among all the pressed notes (keys), or may be the i-th (i is an integer) highest or lowest note (key). These predetermined number, specific note, and the like may be set by user operations or the like, or may be predetermined.

In the case of step S406—Yes, the electronic musical instrument 10 determines that the syllable should progress (progress the lyrics), and sets the return value of the syllable progress determination process to Yes (or True) (step S407).

In the case of step S406—No, the electronic musical instrument 10 determines that the syllable should be maintained (the lyrics do not progress) although it is not a simultaneous chord, and sets the return value of the syllable progress determination process to No (or False) (step S405).

Further, in the case of step S402—No, since there is no simultaneous chord, the electronic musical instrument 10 determines that the syllable should progress (the lyrics progress), and the return value of the syllable progress determination process is set to Yes (or True) (step S407).

According to the syllable progress determination process as shown in FIG. 11, for example, the syllable can be advanced when a plurality of sounds having a large time difference are produced (i.e., when a melody is played), and the syllable does not advance when a plurality of sounds having a small time difference are produced (i.e., when a simultaneous chord (harmony) is being played).

<Syllable Change>

Figure 12:
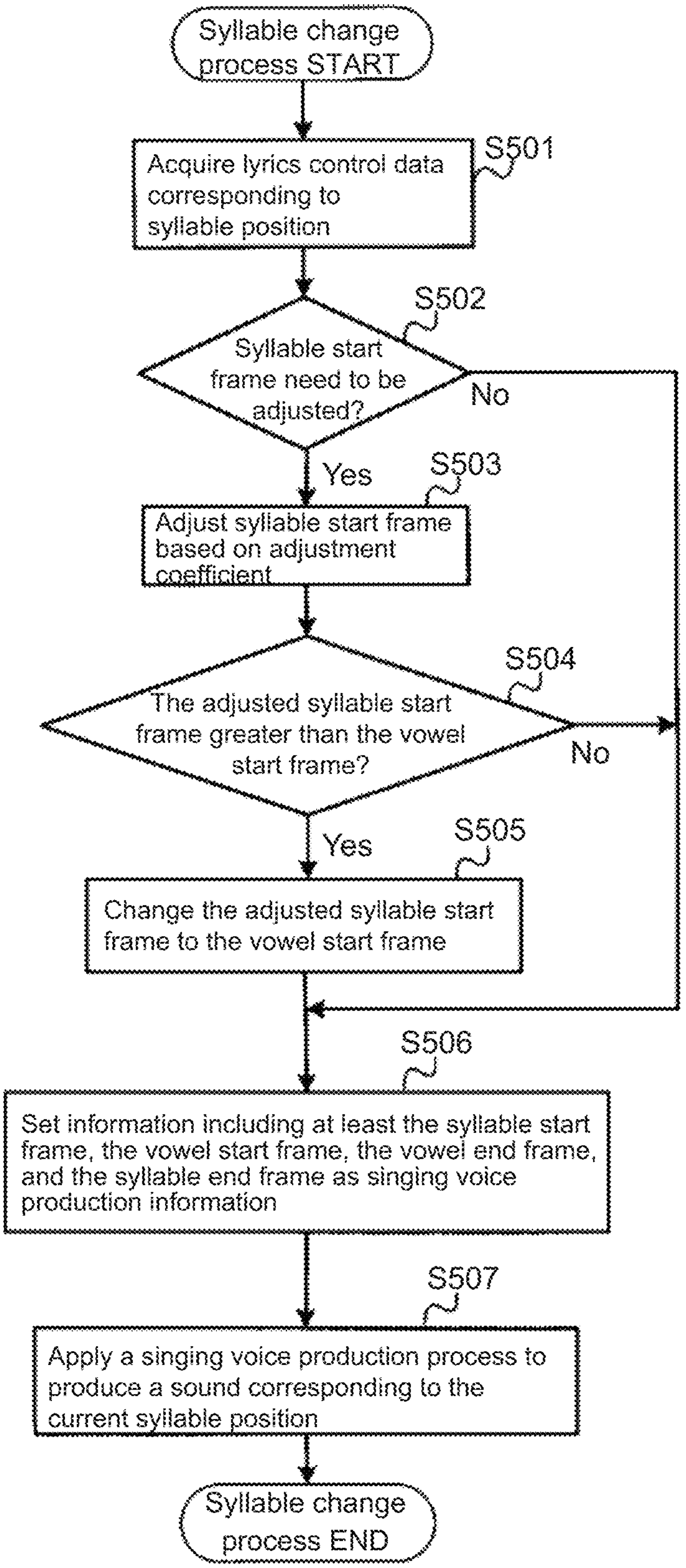
FIG. 12 is a diagram showing an example of a flowchart of the syllable change process according to an embodiment.

FIG. 12 is a diagram showing an example of a flowchart of the syllable change process according to an embodiment.

The electronic musical instrument 10 acquires lyrics control data corresponding to the syllable position that has been already acquired in the performance control process (step S501).

Here, the lyrics control data may be data including parameters related to production (singing voice synthesis) of each syllable included in the lyrics. If data including parameters related to the production of a syllable is referred to as syllable control data, the lyrics control data may include one or more syllable control data.

For example, the syllable control data may include information such as sound generation timing (sounding timing), syllable start frame, vowel start frame, vowel end frame, syllable end frame, lyrics (or syllable) (or character information thereof), and the like. The frame may be a constituent unit for the above-mentioned phoneme (phoneme sequence), or may be another time unit. Hereinafter, the lyrics control data and the syllable control data will be described without particular distinction.

The sounding timing may indicate a reference timing (or an offset) for each frame (for example, a syllable start frame, a vowel start frame, etc.). The sounding timing may be given in terms of time since the key press. The sounding timing and information of each frame may be specified by the number of frames (frame unit).

The sound corresponding to the syllable may start at the syllable start frame and end at the syllable end frame. Of the syllables, the sound corresponding to the vowel may start at the vowel start frame and end at the vowel end frame. That is, normally, the vowel start frame has a value equal to or higher than the syllable start frame, and the vowel end frame has a value equal to or lower than the syllable end frame.

The syllable start frame may correspond to the start address information of the syllable frame. The syllable end frame may correspond to the final address information of the syllable frame.

Next, the electronic musical instrument 10 determines whether it is necessary to adjust the syllable start frame of the lyrics control data acquired in step S501 (step S502). For example, when a frame position adjustment flag is high (set), the electronic musical instrument 10 may determine that it is necessary to adjust the syllable start frame. The electronic musical instrument 10 may control the value of the frame position adjustment flag based on the operation of the function key, or may determine the value of the frame position adjustment flag based on parameters of the lyrics control data.

When it is necessary to adjust the syllable start frame (step S502—Yes), the electronic musical instrument 10 adjusts the syllable start frame based on an adjustment coefficient (step S503). The electronic musical instrument 10 may calculate, for example, a value obtained by applying a predetermined operation (for example, addition, subtraction, multiplication, division) using an adjustment coefficient to the syllable start frame as a new (adjusted) syllable start frame.

The adjustment coefficient may be an appropriate parameter (for example, offset amount, number of frames, etc.) for reducing (or deleting) the white noise portion of the syllable. The adjustment factor may have different (or independent) values for respective syllables. The adjustment coefficient may be included in the lyrics control data or may be determined based on the lyrics control data.

The adjustment of the syllable start frame in step S503 may be applied only to the sound that is sounded while a key in the control key range is pressed, and/or may be applied to the sound that is sounded when no key in the control key range is pressed.

After step S503, the electronic musical instrument 10 determines whether or not the value of the adjusted syllable start frame is greater than the value of the vowel start frame (step S504). When the value of the adjusted syllable start frame is larger than the value of the vowel start frame (step S504—Yes), the electronic musical instrument 10 changes the value of the adjusted syllable start frame to the value of the vowel start frame (step S505).

According to steps S504 and S505, for example, white noise can be reduced as much as possible, and sound production can be started from the beginning of the vowel. If the sound production starts in the middle of the vowel, the attack feeling of the sound production deteriorates, but by starting the sound production from the beginning of the vowel, the deterioration of the attack feeling can be suppressed.

After step S502—No, step S504—No, or step S505, the electronic musical instrument 10 sets information including at least the syllable start frame, the vowel start frame, the vowel end frame, and the syllable end frame as singing voice production information (step S506). As described above, the syllable start frame here may be the value of the syllable start frame included in the lyrics control data, the value of the syllable start frame adjusted using the adjustment coefficient, or the value of the vowel start frame.

The electronic musical instrument 10 applies a singing voice production process to produce a sound corresponding to the current syllable position (step S507). In the singing voice production processing, the electronic musical instrument 10 may use the singing voice production information in step S506 and the key pressed in the playing key range (the pitch obtained therefrom) in order to generate the sound corresponding to the current syllable position.

In the singing voice reproduction processing, for example, the electronic musical instrument 10 may acquire the acoustic feature data (formant information) of the singing voice data corresponding to the current syllable position from the singing voice control unit 307, instruct the sound source 308 to output instrumental sound with a pitch specified by the key press (generation of the instrumental sound waveform data), and instruct the singing voice synthesis unit 309 to apply the above-mentioned formant information to the instrumental sound waveform data output from the sound source 308.

Further, for example, the processing unit 306 may transmit the specified pitch data (pitch data corresponding to the pressed key), the singing voice data corresponding to the current syllable position, and the singing voice production information corresponding to the current syllable position to the singing voice control unit 307. The singing voice control unit 307 then may estimate the acoustic feature sequence based on the input of these data, and may output the corresponding formant information 318 and the vocal cord sound source data (pitch information) 319 to the singing voice synthesis unit 309. In this acoustic feature sequence, the sound production start frame may be adjusted based on the singing voice production information.

The singing voice synthesis unit 309 then may generate singing voice waveform data based on the input formant information 318 and vocal cord sound source data (pitch information) 319, and may output the singing voice waveform data to the sound source 308. Then, the sound source 308 performs sound production processing on the singing voice waveform data acquired from the singing voice synthesis unit 309.

Even when the determination result of the syllable progression determination process in step S301 is No (or False), the electronic musical instrument 10 may produce the sound corresponding to the current syllable position based on the already obtained singing voice production information and the key pressed in the playing key range by applying the singing voice production process.

Modification Examples

In the electronic instrument 10, in order to have the assigned syllables on keys in the control key range be visually recognized (or distinguished, grasped, and understood), at least one of characters, figures, markings, and patterns may be displayed on the keys in the control key range to which the syllables are assigned. Alternatively, at least one of the color, luminance and saturation of the key may be changed using, for example, a light emitting element (Light Emitting Diode (LED)) incorporated in the keys.

Further, in the electronic musical instrument 10, the key corresponding to the current syllable position can be made visually recognized (or distinguished, grasped, and understood) as being the current syllable position (in other words, can be distinguished from other keys). At least one of characters, figures, markings, patterns different from other keys may be displayed, or at least one of key colors, luminance and saturation different from other keys may be displayed for this purpose.

Figure 13A:
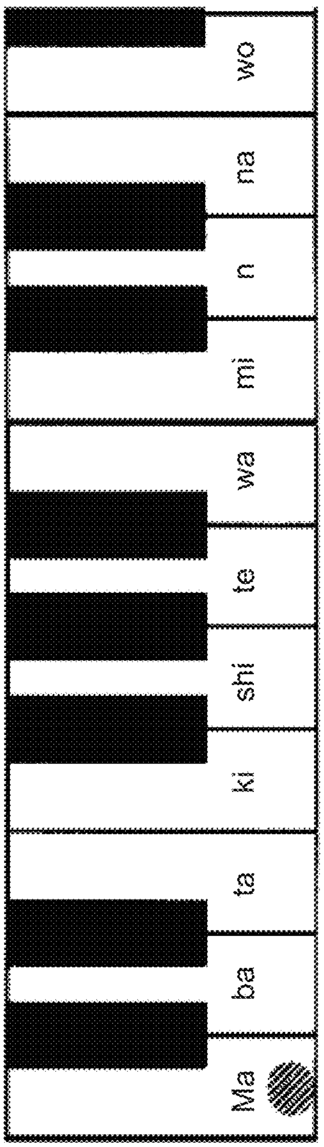
FIGS. 13A and 13B are diagrams showing an example of the appearance of the keys in the control key range.
Figure 13B:
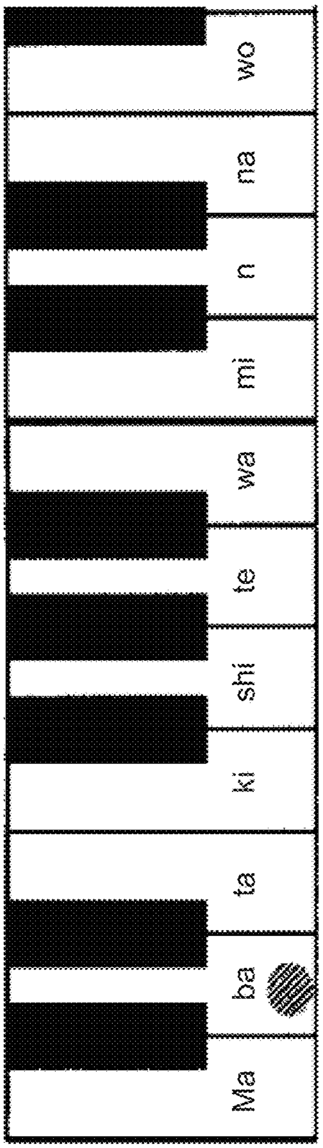

FIGS. 13A and 13B are diagrams showing an example of the appearance of the keys in the control key range. In this example, the lyrics "Ma ba to ki shi to wa mi n na wo" are displayed so that they can be visually recognized on each of the 11 white keys of C1-F2 in the control key range.

Further, in FIG. 13A, a part of the key of C1 is emitting light ("○" part in the figure). In FIG. 13B, a part of the key of D1 is emitting light ("α" part in the figure). In FIGS. 13A and 13B, the performer can easily understand that the current syllable positions are "ma" and "ba", respectively.

As shown in FIGS. 13A and 13B, when the keys to which the syllables are assigned are displayed so that they can be understood, the number of keys in the control key range does not have to be fixed, and may be varied according to the lyrics of the song being currently played. For example, when the number of syllables in the lyrics is x (x is an integer), it is sufficient for the control key range to include the x keys of the white keys. In this case, it is possible to avoid a situation in which the number of keys in the playing key range is always insufficient (there is little freedom in the pitches that can be played) regardless of which lyrics are selected.

In the above-described embodiment, it is assumed that the lyrics data is selected based on the operation of a specific function key (for example, a button, a switch, etc.), but the present invention is not limited to this. For example, the electronic musical instrument 10 may select lyrics data based on the operation of a key (for example, a black key) in the control key range to which a syllable is not assigned. For example, the leftmost black key in the control key range may indicate the selection of the lyrics immediately before the current lyrics in one song, and the second black key from the left in the control key range may indicate the selection of the lyrics immediately after the current lyrics in one song.

The electronic musical instrument 10 may control the display 150*d* to display lyrics. For example, the lyrics near the current lyrics position (syllable index) may be displayed, and the lyrics corresponding to the sound being produced, the lyrics corresponding to the sound that has been produced, and the like may be displayed by coloring or the like in such a manner that the current lyrics position can be recognized.

The electronic musical instrument 10 may transmit at least one of singing voice data, information regarding the current position of lyrics, and the like to an external device (for example, a smartphone or a tablet terminal). The external device may display the lyrics on its own display based on the received singing voice data, information on the current position of the lyrics, and the like.

In the above example, the electronic musical instrument 10 is a keyboard instrument such as a keyboard, but the present invention is not limited to this. The electronic musical instrument 10 may be an electric violin, an electric guitar, a drum, a trumpet, or the like, as long as it is a device having a configuration in which the timing of sound generation can be specified by a user's operation.

Therefore, the "key" of the present disclosure may be regarded to indicate a string, a valve, some other performance operating elements for specifying a pitch, an arbitrary performance operating element, or the like. The "key press" of the present disclosure may be understood to mean a keystroke, picking, playing, operating element operation, user operation, or the like. The "key release" in the present disclosure may be understood to mean a string stop, a mute, a performance stop, an operating element stop (non-operation), or the like.

Further, the operating element (for example, performance controls, keys) of the present disclosure may be operating elements displayed on a touch panel (key images, etc.), a virtual keyboard, or the like. In this case, the electronic musical instrument 10 is not limited to a so-called musical instrument (keyboard or the like), and may be a mobile phone, a smartphone, a tablet terminal, a personal computer (Personal Computer (PC)), a television or the like.

Figure 14:
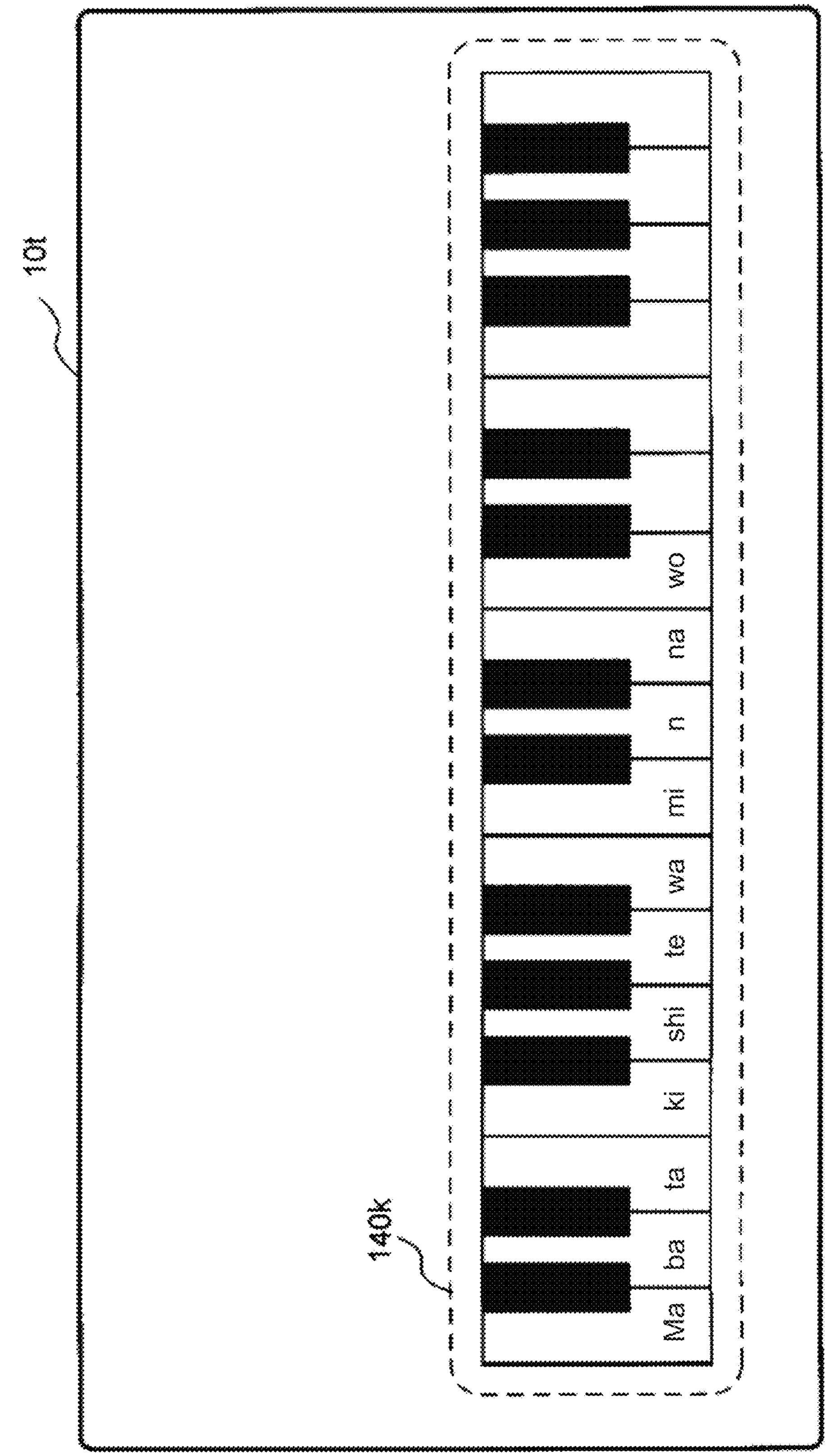
FIG. 14 is a diagram showing an example of a tablet terminal that implements the lyrics progression control method according to the embodiment.

FIG. 14 is a diagram showing an example of a tablet terminal that implements the lyrics progression control method according to the embodiment. The tablet terminal 10*t* displays at least the keyboard 140*k* on the display. A part of this keyboard 140*k* (11 white keys of C1-F2 in this example) corresponds to the control key range, and the lyrics "Ma ba to ki shi to wa mi n na wo" are displayed on a total of 11 white keys of C1-F2, respectively, in the control key range so that they can be visually recognized.

Further, the external device that has received the above-mentioned singing voice data, information on the current lyric position, and the like may also display the assigned syllable, the keyboard 140*k* indicating the current syllable position, and the like as shown in FIG. 14.

As described above, the electronic musical instrument 10 of the present disclosure can provide a new playing experience, and the user (performer) can enjoy the performance more.

For example, the electronic musical instrument 10 of the present disclosure can easily find the beginning of lyrics. Since the position of the syllable can be visually recognized, it is possible to jump directly to any syllable while playing the lyrics.

Further, the electronic musical instrument 10 of the present disclosure can directly specify and maintain a vowel using only the keyboard when it is desired to keep a specific syllable (vowel) at a specific syllable position during lyrics production. Melisma performance is therefore possible without using pedals or buttons.

Further, the electronic musical instrument 10 of the present disclosure can randomly change the syllable position according to the operation of the keyboard, and the user can play the instrument while changing the combination of syllables. Therefore, it is possible to create not only the original lyrics but also other lyrics like an anagram. For example, when combined with an automatic performance such as a loop performance or an arpeggiator, it is possible to provide a new performance experience that produces lyrics phrases that exceed the user's expectations.

The electronic musical instrument 10 may include a plurality of performance operating elements (for example, keys) to which different pitch data are assigned, and a processor (for example, a CPU). The processor may determine the syllable position included in a phrase based on an operation (for example, key press/release) on operations of operating elements included in the first pitch range (control key range) of the plurality of operating elements. In addition, the processor may produce a syllable sound corresponding to the determined syllable position based on an operation on the operating elements included in the second pitch range (playing key range) of the plurality of operating elements. According to such a configuration, it is possible to easily specify a part of the lyrics that the user wants to produce by using only the keyboard, for example.

Further, when an operating element included in the first pitch range is operated, the processor may determine the syllable position based on the key number corresponding to the operating element in the first pitch range that is operated. According to such a configuration, it is possible to intuitively change to an arbitrary syllable by pressing a key in the first pitch range.

Further, the processor may determine the syllable position based on the key number corresponding to an operating element in the first pitch range that is operated when the operated operating element in the first pitch range is a valid key to which a syllable is assigned. According to such a configuration, it is possible to intuitively change to an arbitrary syllable by operating a key to which a syllable is assigned in the first pitch range. Keys to which no syllable is assigned can be used for purposes other than changing syllables.

Further, when the operating element in the first pitch range is not operated, the processor may shift one syllable position based on the operation of the operating element in the second pitch range. According to such a configuration, it is possible to perform a user-friendly operation in which a syllable is basically advanced only by operating the second pitch range and the first pitch range is operated to jump the syllable only when necessary.

Further, the processor may instruct a sound production in which the syllable start frame of the syllable corresponding to the syllable position is adjusted based on an adjustment coefficient. According to such a configuration, the white noise portion of the syllable can be suitably reduced (or deleted).

Further, when the value of the syllable start frame adjusted based on the adjustment coefficient becomes larger than the value of the vowel start frame of the syllable, the processor may change the value of the adjusted syllable start frame to be the same as the value of the vowel start frame. According to such a configuration, it is possible to suppress deterioration of the attack feeling while reducing white noise as much as possible.

Further, the processor may perform control such that when an operating element in the first pitch range among the plurality of operating elements continues to be operated, the syllable is not advanced no matter how operating elements in the second pitch range are operated, and may perform control such that when none of the operating elements in the first pitch range are operated, the syllable is advanced every time an operating element in the second pitch range is operated. Further, the processor may instruct the sound generation of a syllable corresponding to the syllable position at a pitch specified by an operation on an operating element in the second pitch range. With such a configuration, syllables can be easily maintained.

Further, the processor may perform control such that when an operating element in the first pitch range among the plurality of operating elements continues to be operated, the syllable is not advanced from the syllable position corresponding to the operating element in the first pitch range that has been continuously operated no matter how operating elements in the second pitch range are operated. According to such a configuration, it is possible to perform a user-friendly operation in which a syllable is basically advanced only by operating the second pitch range and the first pitch range is operated to jump the syllable only when necessary.

Further, each syllable included in the phrase may be assigned to one of the operating elements in in the first pitch range. With such a configuration, the user can easily grasp the current syllable position.

Further, the processor may use operating elements in the first pitch range for syllable positioning when a specific function key is operated by the user, and if the specific function key is not operated, the processor may use operating elements in the first pitch range for specifying pitches of the sound to be produced (normal mode, normal operation). With such a configuration, it is possible to appropriately control whether or not the lyrics progress is controlled using the keyboard split.

Further, the processor may cause the operating elements in the first pitch range to display information to help the user understand the syllables assigned to the operating elements. According to such a configuration, the user can easily grasp the keys corresponding to the syllables that constitute the lyrics, so that the next user operation can be appropriately prompted.

In addition, the processor may perform such control that information for displaying to the user the assignment of syllables to operating elements in the first pitch range on an external device is transmitted to the external device. According to such a configuration, the user can easily grasp the keys corresponding to the syllables constituting the lyrics by viewing the external device, so that the next user operation can be appropriately prompted.

The block diagrams used in the description of the above embodiments show blocks of functional units. These functional blocks (components) are realized by any combination of hardware and/or software. Further, the means for realizing each functional block is not particularly limited. That is, each functional block may be realized by one physically connected device, or may be realized by a plurality of devices connecting two or more physically separated devices by wire or wirelessly.

The terms described in the present disclosure and/or the terms necessary for understanding the present disclosure may be replaced with terms having the same or similar meanings.

The information, parameters, etc., described in the present disclosure may be represented using absolute values, relative values from a predetermined value, or other corresponding information. Moreover, the names used for parameters and the like in the present disclosure are not limited in any respect.

The information, signals, etc., described in the present disclosure may be represented using any of a variety of different techniques. For example, data, instructions, commands, information, signals, bits, symbols, chips, etc., that are referred to throughout the above description may be represented by voltages, currents, electromagnetic waves, magnetic fields or magnetic particles, light fields or photons, or any combinations of these.

Information, signals, etc., may be input/output via a plurality of network nodes. The input/output information, signals, and the like may be stored in a specific location (for example, a memory) or may be managed using a table. Input/output information, signals, etc., can be overwritten, updated, or added. The information, signals, etc., that has been output may be deleted. The information, signals, etc., that has been input may be transmitted to other devices.

Software, regardless of whether it is referred to as software, firmware, middleware, microcode, hardware description language, or by any other name, broadly means an instruction, instruction set, code, code segment, program code, program, subprogram, software module, applications, software applications, software packages, routines, subroutines, objects, executable files, execution threads, procedures, functions, etc., and any combination of these.

Further, software, instructions, information and the like may be transmitted and received via a transmission medium. For example, when software is transmitted from a website, server, or other remote source using at least one of wired technology (coaxial cable, fiber optic cable, twisted pair, digital subscriber line (DSL), etc.) and wireless technology (infrared, microwave, etc.), at least one of these wired and wireless technologies is included within the definition of the transmission medium.

Each aspect/embodiment described in the present disclosure may be used alone, in combination, or switched in the course of execution. Further, the order of the processing procedures, sequences, flowcharts, etc., of each aspect/embodiment described in the present disclosure may be changed as long as there is no contradiction. For example, the methods described in the present disclosure present elements of various steps using exemplary order, and are not limited to the particular order presented.

The phrase "based on" as used in this disclosure does not mean "based only on" unless otherwise stated. In other words, the statement "based on" means both "based only on" and "based at least on".

Any reference to elements using designations such as "first", "second" as used in this disclosure does not generally limit the quantity or order of those elements. These designations can be used in the present disclosure as a convenient way to distinguish between two or more elements. Thus, references to the first and second elements do not mean that only two elements can be adopted or that the first element must somehow precede the second element.

When "include", "including" and variations thereof are used in the present disclosure, these terms are intended as comprehensive as the term "comprising". Furthermore, the term "or" used in the present disclosure is intended not to be an exclusive OR.

"A/B" in the present disclosure may mean "at least one of A and B".

In the present disclosure, if articles are added by translation, for example, a, an and the in English, the singular noun that follows may encompass corresponding plural noun.

Although the invention according to the present disclosure has been described in detail above, it is apparent to those skilled in the art that the invention according to the present disclosure is not limited to the embodiments described in the present disclosure. The invention according to the present disclosure can be implemented as amended or modified without departing from the spirit and scope of the invention determined based on the description of the scope of claims. Therefore, the description of the present disclosure is for purposes of illustration only and does not unduly limit the scope of the invention.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. An electronic musical instrument comprising:

a plurality of keys that include at least first keys corresponding to a first pitch range and second keys corresponding to a second pitch range, a plurality of syllables constituting a phrase being assigned to different ones of the first keys, respectively; and at least one processor, configured to perform the following:

in accordance with a key operation to one of the first keys in the first pitch range, determining a syllable position in the phrase; and in accordance with a key operation in the second pitch rang, instructing a sound production of a digitally synthesized sound corresponding to the determined syllable position, wherein in instructing the sound production, a syllable start frame of a syllable corresponding to the syllable position is adjusted based on an adjustment coefficient, and wherein when start address information of the syllable start frame adjusted based on the adjustment coefficient becomes larger than start address information of a vowel start frame of the syllable, the at least one processor changes the start address information of the adjusted syllable start frame to be the same as the start address information of the vowel start frame.

2. The electronic musical instrument according to claim 1, wherein the at least one processor determines the syllable position based on a key number corresponding to a key in the first pitch range that is operated.

3. The electronic musical instrument according to claim 2, wherein the at least one processor determines the syllable position when the key in the first pitch range that is operated is a valid key to which a syllable has been assigned.

4. The electronic musical instrument according to claim 1, wherein the at least one processor causes the syllable position to move by one position in response to a key operation in the second pitch range that is performed while none of the first keys in the first pitch range are operated.

5. A method performed by at least one processor included in an electronic musical instrument that includes, in addition to the at least one processor, a plurality of keys that include at least first keys corresponding to a first pitch range and second keys corresponding to a second pitch range, a plurality of syllables constituting a phrase being assigned to different ones of the first keys, respectively, the method comprising, via the at least one processor:

in accordance with a key operation to one of the first keys in the first pitch range, determining a syllable position contained in the phrase; and in accordance with a key operation in the second pitch rang, instructing a sound production of a digitally synthesized sound corresponding to the determined syllable position, wherein in instructing the sound production, a syllable start frame of a syllable corresponding to the syllable position is adjusted based on an adjustment coefficient, and wherein when start address information of the syllable start frame adjusted based on the adjustment coefficient becomes larger than start address information of a vowel start frame of the syllable, the start address information of the adjusted syllable start frame is changed to be the same as the start address information of the vowel start frame.

6. The method according to claim 5, wherein the syllable position is determined based on a key number corresponding to a key in the first pitch range that is operated.

7. The method according to claim 6, wherein the syllable position is determined when the key in the first pitch range that is operated is a valid key to which a syllable has been assigned.

8. The method according to claim 5, wherein the syllable position is moved by one position in response to a key operation in the second pitch range that is performed while none of the first keys in the first pitch range are operated.

9. A non-transitory computer readable storage medium storing a program readable by at least one processor included in an electronic musical instrument that includes, in addition to the at least one processor, a plurality of keys that include at least first keys corresponding to a first pitch range and second keys corresponding to a second pitch range, a plurality of syllables constituting a phrase being assigned to different ones of the first keys, respectively, the program instructing the at least one processor to perform the following:

in accordance with a key operation to one of the first keys in the first pitch range, determining a syllable position contained in the phrase; and in accordance with a key operation in the second pitch rang, instructing a sound production of a digitally synthesized sound corresponding to the determined syllable position, wherein in instructing the sound production, a syllable start frame of a syllable corresponding to the syllable position is adjusted based on an adjustment coefficient, and wherein when start address information of the syllable start frame adjusted based on the adjustment coefficient becomes larger than start address information of a vowel start frame of the syllable, the start address information of the adjusted syllable start frame is changed to be the same as the start address information of the vowel start frame.

* * * * *